(12) United States Patent
Davydov

(10) Patent No.: US 10,382,107 B2
(45) Date of Patent: Aug. 13, 2019

(54) MULTI-USER MULTIPLE INPUT MULTIPLE OUTPUT COMMUNICATION SYSTEMS AND METHODS

(71) Applicant: INTEL CORPORATION, Santa Clara, CA (US)

(72) Inventor: Alexei Davydov, Nizhny Novgorod (RU)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/744,007

(22) PCT Filed: Dec. 24, 2015

(86) PCT No.: PCT/US2015/000329
§ 371 (c)(1),
(2) Date: Jan. 11, 2018

(87) PCT Pub. No.: WO2017/026974
PCT Pub. Date: Feb. 16, 2017

(65) Prior Publication Data
US 2018/0198495 A1    Jul. 12, 2018

Related U.S. Application Data

(60) Provisional application No. 62/204,218, filed on Aug. 12, 2015, provisional application No. 62/232,390, filed on Sep. 24, 2015.

(51) Int. Cl.
*H04B 7/06* (2006.01)
*H04B 7/0452* (2017.01)
(Continued)

(52) U.S. Cl.
CPC ......... *H04B 7/0452* (2013.01); *H04B 7/0473* (2013.01); *H04B 7/0697* (2013.01);
(Continued)

(58) Field of Classification Search
CPC .. H04B 7/0452; H04B 7/0473; H04B 7/0697; H04L 1/1812; H04L 1/1861;
(Continued)

(56) References Cited

U.S. PATENT DOCUMENTS 9,807,617 B2 * 10/2017 Zhu .................... H04L 1/06
2011/0267972 A1 * 11/2011 Yoon .................. H04L 5/0023
370/252

(Continued)

OTHER PUBLICATIONS

Huawei, "Discussion on MU-MIMO in LTE-A," 3GPP TSG RAN WG1 #58, R1-093058; Shenzhen, China, Aug. 24-28, 2009; 7 pages.
(Continued)

*Primary Examiner* — Siu M Lee
(74) *Attorney, Agent, or Firm* — Schwabe, Williamson & Wyatt, P.C.

(57) ABSTRACT

Embodiments provide methods for wireless Multi-User Multiple Input Multiple Output communications comprising creating a Demodulation reference signal (DM-RS); the DM-RS being associated with at least one of or more than one antenna port, a scrambling identity, a number of layers or an orthogonal code associated with the reference signal.

15 Claims, 13 Drawing Sheets

FIG. 1

(51) Int. Cl.

| | |
|---|---|
| *H04B 7/0456* | (2017.01) |
| *H04J 11/00* | (2006.01) |
| *H04J 13/00* | (2011.01) |
| *H04J 13/12* | (2011.01) |
| *H04J 13/18* | (2011.01) |
| *H04L 1/18* | (2006.01) |
| *H04L 5/00* | (2006.01) |
| *H04L 25/03* | (2006.01) |
| *H04L 27/26* | (2006.01) |
| *H04L 25/02* | (2006.01) |

(52) U.S. Cl.
CPC ......... *H04J 11/003* (2013.01); *H04J 13/0003* (2013.01); *H04J 13/004* (2013.01); *H04J 13/12* (2013.01); *H04J 13/18* (2013.01); *H04L 1/1812* (2013.01); *H04L 1/1861* (2013.01); *H04L 1/1893* (2013.01); *H04L 5/0025* (2013.01); *H04L 5/0051* (2013.01); *H04L 5/0053* (2013.01); *H04L 5/0055* (2013.01); *H04L 5/0091* (2013.01); *H04L 25/03929* (2013.01); *H04L 27/26* (2013.01); *H04L 27/2613* (2013.01); *H04L 25/0204* (2013.01)

(58) Field of Classification Search
CPC ... H04L 1/1893; H04L 27/26; H04L 27/2613; H04L 25/0204; H04L 25/03929; H04L 5/0025; H04L 5/0051; H04L 5/0053; H04L 5/0055; H04L 5/0091; H04J 13/003; H04J 13/004; H04J 13/12; H04J 13/18; H04J 11/003

See application file for complete search history.

(56) References Cited

U.S. PATENT DOCUMENTS

| | | | |
|---|---|---|---|
| 2014/0092829 A1* | 4/2014 | Han | H04L 5/0035 370/329 |
| 2014/0153488 A1* | 6/2014 | Koivisto | H04B 1/10 370/328 |
| 2015/0078285 A1* | 3/2015 | Kim | H04B 7/2656 370/329 |
| 2018/0006863 A1* | 1/2018 | Li | H04L 29/06 |
| 2018/0115965 A1* | 4/2018 | Takeda | H04L 5/0016 |

OTHER PUBLICATIONS

3GPP TS 36.211 V12.7.0 (Sep. 2015); "Technical Specification Group Radio Access Network; Evolved Universal Terrestrial Radio Access (E-UTRA); Physical channels and modulation (Release 12)," 136 pages.

3GPP TS 36.212 V12.6.0 (Sep. 2015); "Technical Specification Group Radio Access Network; Evolved Universal Terrestrial Radio Access (E-UTRA); Multiplexing and channel coding (Release 12)," 95 pages.

International Search Report and Written Opinion for International Patent Application No. PCT/US2015/000329 dated Aug. 22, 2016; 14 pages.

CMCC; "Performance evaluation of multi-user dual-layer beamforming," Agenda Item: 14; 3GPP TSG-RAN WG1 #57bis R1-092824; Jun. 29-Jul. 3, 2009, Los Angeles, USA; 5 pages.

* cited by examiner

MULTI-USER MULTIPLE INPUT MULTIPLE OUTPUT COMMUNICATION SYSTEMS AND METHODS

CROSS REFERENCE TO RELATED APPLICATIONS

The present application is a national phase entry under 35 U.S.C. § 371 of International Application No. PCT/US2015/000329, filed Dec. 24, 2015, entitled "MULTI-USER MULTIPLE INPUT MULTIPLE OUTPUT COMMUNICATION SYSTEMS AND METHODS", which claims priority to U.S. Provisional Patent Application No. 62/204,218, filed Aug. 12, 2015, entitled "METHOD OF THE ADDITIONAL DM-RS PORTS SUPPORT FOR MU-MIMO IN LTE", and U.S. Provisional Patent Application No. 62/232,390, filed Sep. 24, 2015, entitled "ADDITIONAL DM-RS PORTS SUPPORT FOR MU-MIMO IN LTE"; the entire disclosures of which are hereby incorporated by reference in their entireties.

BACKGROUND

There is an ever increasing demand for network capacity as the number of wireless devices increases. With that increasing demand for capacity and increasing user equipment (UE) numbers comes a greater need for spectrum management, in terms of, for example, spectral efficiency and mitigating interference. Various techniques exist for increasing the traffic carrying capacity of a channel or cell. Those techniques comprise assigning subcarriers to specific user equipments, using multiple access techniques such as Orthogonal Frequency Division Multiple Access (OFDMA) and Single Carrier Frequency Division Multiple Access (SC-FDMA) in, for example, Long Term Evolution (LTE) and Long Term Evolution Advanced (LTE-A).

Other techniques also exist such as, for example, beamforming in which radio energy is transmitted in directional manner. A number of antennas can be arranged to produce a resulting beam pattern comprising lobes and nulls that can be used to improve signal to noise ratios and signal to noise plus interference ratios. Beamforming supports multi-user communications and, in particular, the antennas can be used to support multiple-input multiple output (MIMO) communications such as, for example, multi-user MIMO (MU-MIMO).

BRIEF DESCRIPTION OF THE DRAWINGS

Aspects, features and advantages of embodiments will become apparent from the following description given in reference to the appended drawings in which like numerals denote like elements and in which.

DETAILED DESCRIPTION

In LTE Rel-9, a dual layer beamforming based transmission mode 8 (TM8) was introduced. In TM8, PDSCH demodulation is based on Demodulation Reference Signals (DM-RS). Using DM-RS, a DM-RS port can be precoded using the same precoder as its associated PDSCH layer. For MU-MIMO, transparent MU-MIMO is supported because any DM-RS overhead does not change with the increase of MU-MIMO transmission rank. A maximum of four rank one users can be served in one MU-MIMO transmission. To support four rank one users with only two DM-RS ports 7/8, one additional scrambling identity $n_{SCID}$ ($n_{SCID}=1$) was introduced. Thus four rank one users will use a {DM-RS, SCID} pair that belongs to {7/8, 0/1} to generate DM-RS sequences; where 7/8 refer to antenna ports, in particular, virtualized antenna ports, and 0/1 refer to respective scrambling identities. Since DM-RSs with different $n_{SCID}$ are not orthogonal, an eNB can use spatial precoding to mitigate any inter-user interference.

In LTE Rel-10, a further transmission mode, TM9, was introduced that extends the DM-RS structure of TM8 to support up to rank eight SU-MIMO transmissions. However, for MU-MIMO operation, TM9 keeps the same MU-MIMO transmission order as TM8. Two DM-RS antenna ports {11, 13} are added to the same 12 Resource Elements (RE) of DM-RS ports {7, 8} using length four orthogonal cover codes (OCC). A second group of 12 REs is reserved for four other DM-RS ports {9, 10, 12, 14}. When the transmission rank is greater than 2, both DM-RS groups are used.

In LTE Rel-11, a still further transmission mode, TM10, was introduced that keeps the same DM-RS structure as TM9. However, instead of using a physical cell ICs to initialize the DM-RS sequence, two virtual cell IDs can be configured for each UE using RRC signaling. The nSCID signaling in DCI Format 2D dynamically chooses one of the virtual cell ID to initialize the DM-RS sequence for a given PDSCH transmission.

The DM-RS antenna ports that are used for PDSCH transmission are indicated in the DCI Formats 2C and 2D using a 3-bit "Antenna port(s), scrambling identity and number of layers indication" field as per 3GPP TS 36.212 V12.6.0 (2015-09), Table 5.3.3.1.5C-1.

Figure 1:
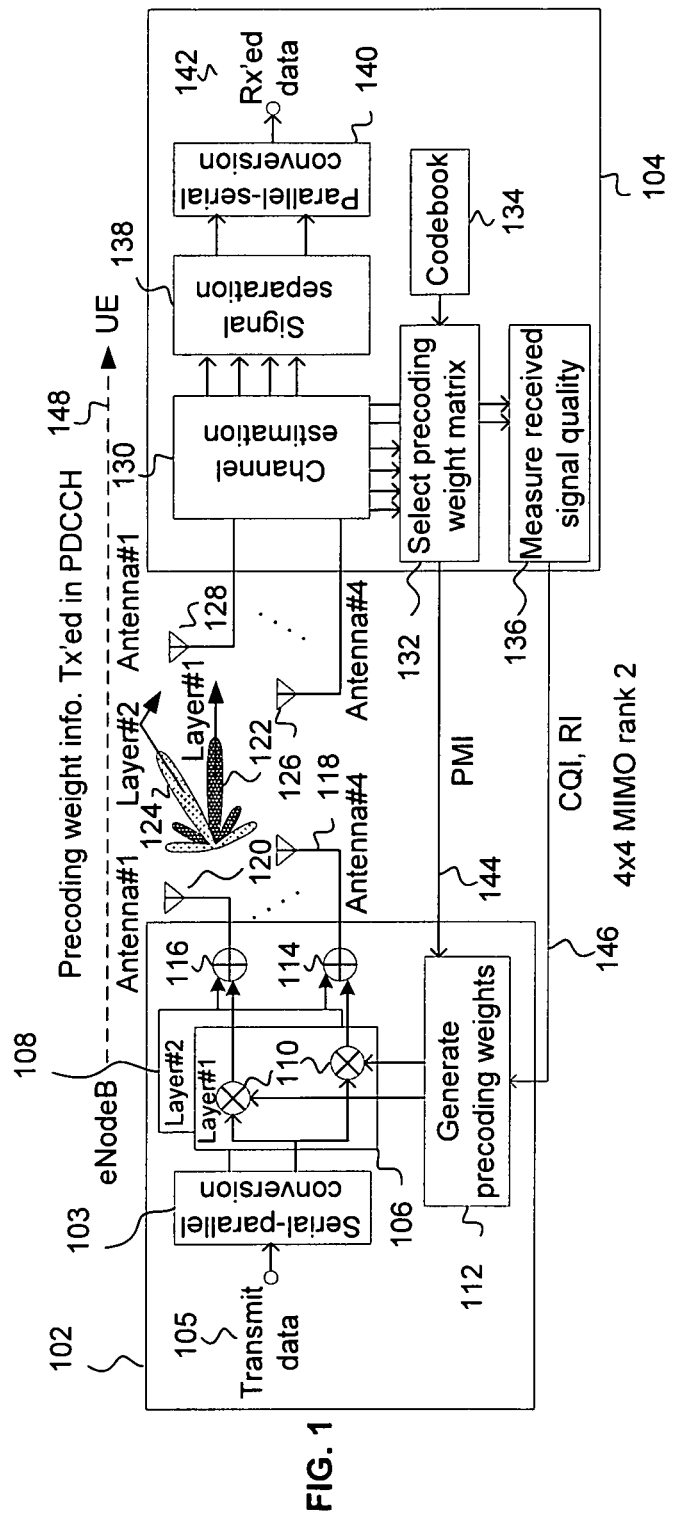
FIG. 1 illustrates an eNB and UE.

FIG. 1 shows a view 100 of a communication system 100 comprising an eNodeB (eNB) 102 and a user equipment (UE) 104. The eNB 102 and the user equipment 104 can be configured to communicate using beam forming. In the example depicted, the eNB 102 is arranged to output at least one beam formed transmission, that is, the eNB directs radio energy in a shaped manner to the user equipment 104. The radio energy is arranged to form an antenna pattern.

The eNB 102 can comprise a serial to parallel converter 103 to convert transmit data 105 to at least one layer for transmission. In the illustrated embodiment, two layers 106 and 108 are shown, that is, layer#1 106 and layer#2 108. Example implementations can be realised that use a plurality of layers such as, for example, 1 to 8 layers. The layers 106 and 108 can be formed by mixing, using respective mixers 110, precoding weights, supplied by a precoding weights generator 112. The outputs of the layers 106 and 108 can be supplied to respective adders 114 and 116. The outputs from the adders 114 and 116 are transmitted to the user equipment 104 via one or more than one antenna of the eNB 102; namely, a plurality of antennas 118 to 120. In the embodiment described, four such antennas 118 to 120 are used; only two of which are depicted. Example implementations can use a plurality of antennas such as, for example, 1, 2, 4, 8 or some other number of antennas. The precoding weights result in one or more than one formed beam. In the example shown, two antenna beam patterns 122 and 124 are formed. The two antenna beam patterns can be directed to one or more than one UE.

The UE 104 can comprise one or more than one antenna. In the illustrated embodiment, a plurality of antennas is provided. More particularly, four antennas are provided; only two 126 and 128 of which are shown. Example implementations can use a plurality of antennas such as, for example, 1, 2, 4, 8 or some other number of antennas. The antennas 126 and 128 receive one or more of the transmit beams 122 and 124. A channel estimator 130 is configured to process signals received by the antennas 126 and 128. The channel estimator 130 can produce channel data associated with an estimate of one or more than one channel between the eNB 102 and the user equipment 104. The channel data is output to a precoding weight matrix selector 132. The precoding weight matrix selector 132 is responsive to a codebook 134 to provide a Precoding Matrix Indicator (PMI) to the eNB 102, in particular, to provide the PMI to the precoding weights generator 112.

The channel estimator 130 forwards the received signals to a signal separator 138. The signal separator 138 is configured to separate the received signals into respective parallel data streams. The parallel data streams are processed by a parallel to serial converter 140 configured to output received data 142.

The channel data from the channel estimator 130 can also provide an output to processing circuitry 136 configured to provide data associated with received signal quality. The data associated with received signal quality can be provided in a closed-loop feedback manner to the eNB 102 for comparison with the transmitted data. In the embodiment illustrated, the data can comprise at least one of a Channel Quality Indicator (CQI) or a Rank Indicator (RI) 146. Example implementations can provide both the CQI and the RI 146 to the eNB 102. The eNB 102 uses at least one of the CQI, RI 146 or PMI 144, taken jointly and severally in any and all permutations, to control adaptively the number of layers transmitted to the user equipment 104 or transmitted to a plurality of UEs.

In the example shown, the eNB 102 and the UE 104 are configured to communicate using 4×4 MIMO with a Rank 2, that is, both layers are destined for the user equipment 104. Alternatively, or additionally, the antennas and layers can be configured to serve a number of UEs. Insofar as concerns the data path, the precoding weights selected by the precoding weights generator 112 are communicated to the user equipment 104 via a communication channel such as, for example, the Physical Downlink Control Channel (PDCCH) 148 of LTE-A.

Figure 2:
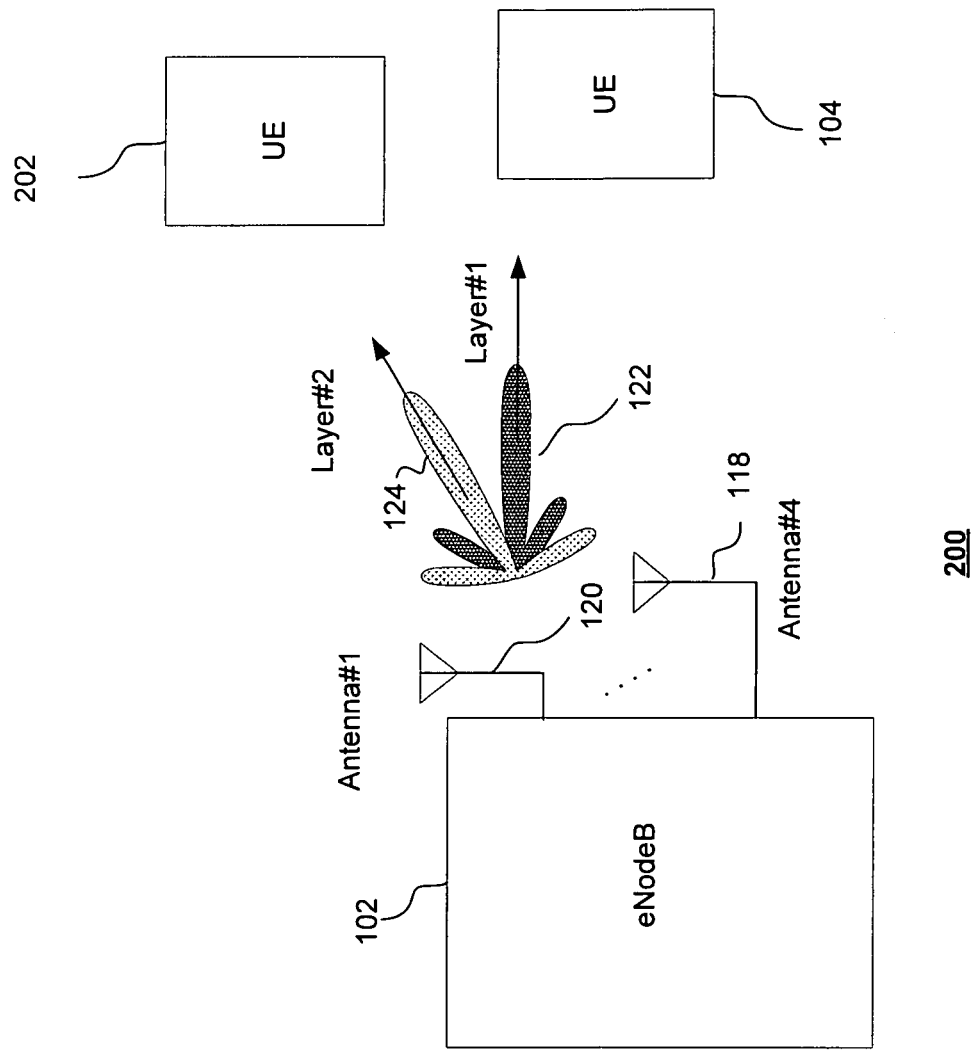
FIG. 2 shows the eNB and a pair of UEs operating using beam forming.

However, the eNB 102 and the UE 104 can be configured to operate in a MU-MIMO manner as shown in FIG. 2, where there is shown a view 200 of the eNB 102 communicating with the above described UE 104 in addition to one or more than one further UE 202. In the embodiment shown, a given layer, such as layer 1, is carried by a respective beam such as antenna pattern 122 whereas a further layer, such as layer 2, is carried by a further respective beam such as antenna pattern 124. The resource elements such as, for example, DM-RS bearing resource elements are conveyed using respective configuration data or parameters sets. The configuration data or parameters sets can prescribe one or more of antenna ports, layers, codes and scrambling identities associated with UE-specific reference signals such as, for example, DM-RS signals. It will be appreciated, however, that precoding for the DM-RS sequence is not communicated since precoding the DM-RS sequence can use a virtual channel estimation based on, for example, angle of arrival of data.

The eNB 102 can be arranged to transmit one or more than one of a pair of downlink synchronisation signals, which are the Primary Synchronisation Signal (PSS) and the Secondary Synchronisation Signal (SSS). This applies to both Frequency Division Duplex (FDD) and Time Division Duplex (TDD). The synchronisation signals are broadcast periodically, or at prescribed times. Embodiments can be realised that broadcast at least one or both of the PSS and SSS in every 10 ms radio frame. The UE 104 uses the synchronisation signals to achieve radio frame, subframe, slot and symbol synchronisation in the time domain, to identify the centre of the channel bandwidth in the frequency domain and to determine the Physical layer Cell Identity (PCI). It will be appreciated that detecting and processing at least one of the synchronisation signals is a prerequisite to measuring the Cell Specific Reference signals (CSI-RS) and decoding the Master Information Block (MIB) on the Physical Broadcast Channel (PBCH).

The UE 104 obtains system information to be able to communicate with one or more than one eNB 102. The system information is carried by the MIB and one or more than one System Information Block (SIB). The MIB conveys the system bandwidth, the System Frame Number (SFN) and the Physical Hybrid Automatic Repeat Request (HARQ) Indicator Channel (PHICH) Configuration.

The MIB is carried on the Broadcast Channel (BCH), which is, in turn, mapped into the Physical Broadcast Channel. The PBCH is transmitted with a fixed coding and modulation scheme and can be decoded after an initial cell search procedure. Once the UE 104 has the MIB, the UE 104 is able to decode the Control Format Indicator (CFI). The CFI provides an indication of the Physical Downlink Control Channel (PDCCH) length, which allows the PDCCH to be decoded. The presence in the PDCCH of a Downlink Control Information (DCI) message scrambled with a System Information Radio Network Temporary Identifier (SI-RNTI) indicates that a SIB is carried in the same subframe. The SIB is transmitted in the Broadcast Control Channel (BCCH) logical channel. One skilled in the art will appreciate that BCCH messages can be carried on the Downlink Shared Channel (DL-SCH) and can be transmitted on the Physical Downlink Shared Channel (PDSCH). The format and resource allocation of the PDSCH transmission can be indicated by a DCI message on the PDCCH.

The UE 104, having achieved synchronisation and being in a position to receive the MIB and SIB, can commence the Random Access Channel (RACH) procedure. The Random Access Channel (RACH) is an uplink transmission that is used by the UE 104 to initiate synchronization with one or more than one eNB 102.

In general, spatial processing occurs at a transmitter. In (single-layer) beam forming, the same signal is emitted from each of the transmit antennas with at least one of appropriate phase or sometimes gain weighting such that the signal power is maximized at a receiver input. The benefits of beamforming are to increase the received signal gain, by making signals emitted from different antennas add up constructively, and to reduce multipath fading effects. When a receiver has multiple antennas, the transmit beam forming cannot simultaneously maximize the signal level at all of the receive antennas, and precoding with multiple streams is used. Note that precoding generally requires knowledge of channel state information (CSI) at the transmitter as indicated above.

In various embodiments, the UE 104 and/or the eNB 102 may include such a plurality of antennas 118 to 120 and 126 to 128 to implement a multiple-input-multiple-output (MIMO) transmission system, which may operate in a variety of MIMO modes, including a single-user MIMO (SU-MIMO) mode, a multi-user MIMO (MU-MIMO) mode, a closed loop MIMO mode, an open loop MIMO mode or, mode associated with variations of smart antenna processing. The UE 104 may provide some type of channel state information (CSI) feedback to the eNB 102 via one or more up link channels, and the eNB 102 may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

As indicated above, in various embodiments, the UE 104 may transmit CSI feedback to the eNB 102 when that information is available. The CSI feedback may include information related to channel quality index (CQI), precoding matrix indicator (PMI), and rank indication (RI). PMI may reference, or otherwise uniquely identify, a precoder within the codebook. The eNB 102 may adjust the downlink channels based on the precoder referenced by the PMI.

Figure 3:
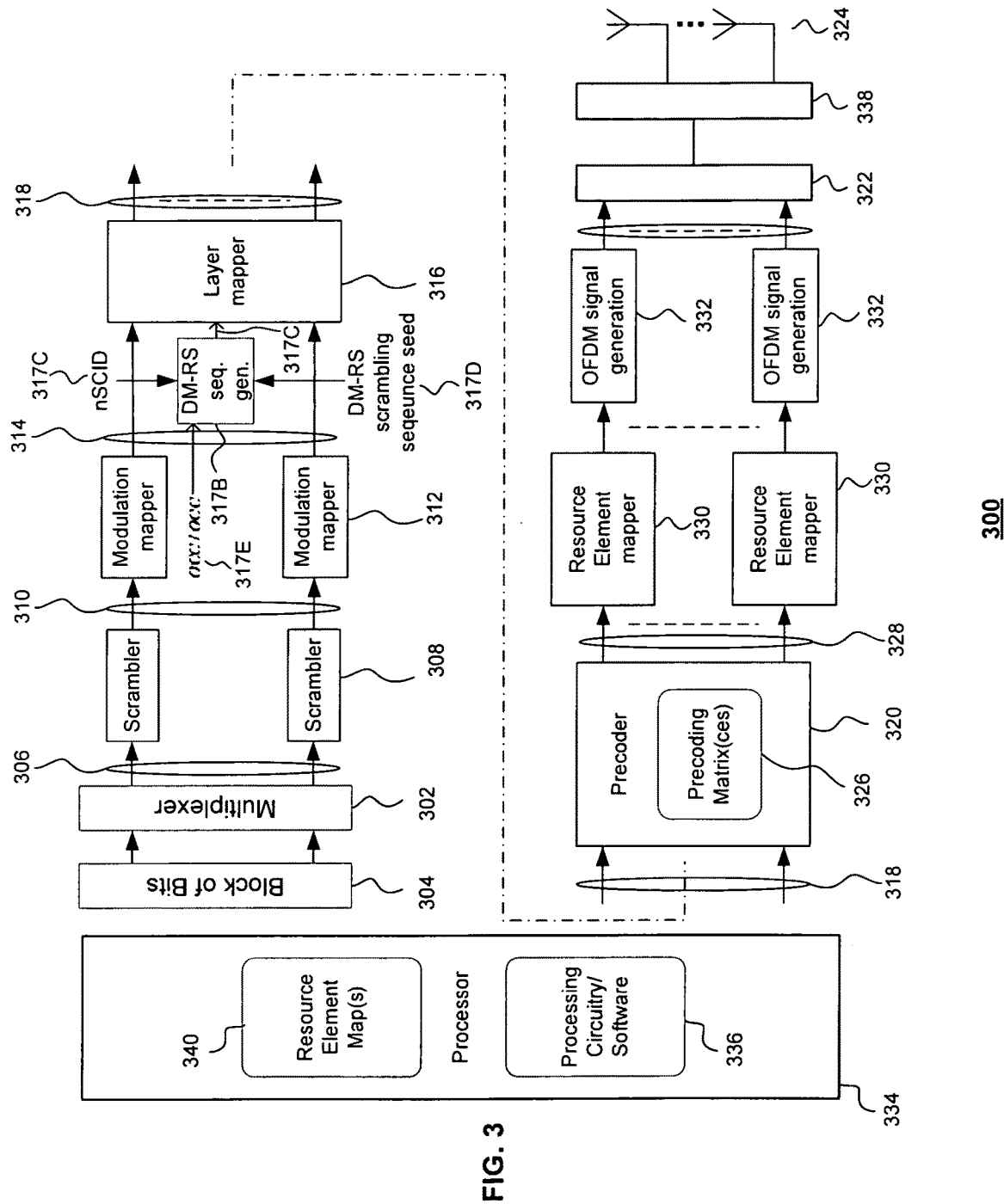
FIG. 3 depicts an eNB.

FIG. 3 depicts a system or apparatus 300, such as, an eNB 102, for realising embodiments. The system 300 of FIG. 3 depicts an architecture that can apply to one or more than one other channel as well as, or as an alternative to, the PDCCH. The one or more than one other channel can be, for example, another control channel or some other type of channel such as, for example, a PBCH, PDSCH, PCFICH, PDCCH, PHICH, PUCCH, PUSCH and PRACH; the latter three channels being uplinks in contrast to the former downlinks.

Baseband signals representing an uplink/downlink physical channels can be defined using the following operations and associated entities. The system 300 may include a multiplexer 302 for multiplexing a block of bits 304. The multiplexer 302 outputs multiplexed bits 306 associated with the block of bits 304.

A scrambler 308 is configured to scramble the multiplexed block of bits 306 to be transmitted in a transmission (e.g., over a physical channel). The scrambler 308 is configured, therefore, to produce scrambled bits 310. The scrambler 308 is responsive to a scrambling code seed to generate a data scrambling sequence.

Using information about the channel, the transmitter may tailor the transmit signal output to the channel in a manner that simplifies or improves receiver processing. The receiver may generate channel-related feedback information by processing training signals received from the transmitter.

A modulation mapper 312 is configured to modulate the scrambled bits 310 to generate modulation symbols 314 for output. These generated modulation symbols 314 can be complex-valued modulation symbols.

The modulation mapper 312 can be configured to selectably use at least one of a binary phase shift keying (BPSK) constellation, a quadrature phase shift keying (QPSK) constellation or a quadrature amplitude (QAM) constellation such as, for example, 8-QAM, 16-QAM, 64-QAM, 256QAM. The type of modulation used may depend on the signal quality or channel conditions. The modulation mapper 312 is not limited to using such modulation constellations. The modulation mapper 312 can, alternatively or additionally, use some other form of modulation constellation.

A layer mapper 316 is configured to map the complex-valued modulation symbols 314 onto one or more than one transmission layer of, or to produce, layered modulation symbols 318. The layer mapper 316 is also responsive to or receives a DM-RS sequence 317A output by a DM-RS sequence generator 317B. The DM-RS sequence generator 317B is responsive to one or more than one seed parameter that influences the DM-RS sequence generating process or operation. Embodiments can be realised in which the one or more than one seed parameter comprises at least one of a scrambling identity 317C or a DM-RS scrambling sequence seed 317D in accordance with, for example, 3GPP TS 36.211 v12.7.0 (2015-09), section 5.5, or earlier technical standard (TS), and 3GPP TS 36.212, v12.6.0 or earlier TS. As appropriate, embodiments can provide an indication regarding whether or not a higher layer parameter Active-DM-RS-with orthogonal cover code signal (OCC) is set, which will influence the OCC used, if any. Therefore, the DM-RS sequence generator can also be responsive to an OCC enable/disable signal 317E. The OCC enable/disable signal influences or controls whether or not an OCC is used in generating or representing the DM-RS sequence 317A.

A precoder 320 is configured to precode the layered modulation symbols 318 for transmission or output. The precoder 320 may encode the complex-valued modulation symbols 318 on each layer for transmission onto one or more than one respective antenna port 322. Precoding may be used to convert antenna domain signal processing into beam-domain processing. Additionally, the one or more than one antenna port 322 may also be coupled to one or more than one respective antenna such as, for example, the plurality of antennas 324 shown or can be one or more than one virtual antenna port. The precoding performed by the precoder 320 may be chosen from a finite set of precoding matrices 326, called a codebook, which is known to both a receiver and a transmitter. The precoder 320 is configured to output coded symbols 328.

A resource element mapper 330 is configured to map the coded symbols 328 output by the precoder 330 to respective resource elements. The resource element mapper 330 can map at least one of actual data symbols, one or more than one reference signal, one or more than one positioning signal, one or more than one synchronization signal or one or more than one control information symbol, taken jointly and severally in any and all permutations, into predetermined or selected respective resource elements in a resource grid.

One or more than one OFDM signal generator 332 is configured to generate a complex-valued time-division duplex (TDD) and/or frequency division duplex (FDD)

OFDM signal for the one or more than one antenna port 322 for transmission via the one or more than one antenna 324 after processing, such as up-conversion, by an RF front end 338, to a selectable frequency band. The one or more than one antenna can comprise antennas such as the above antennas 118, 120, 126 and 128.

Also shown in FIG. 3, is a processor 334. The processor 334 comprises processing circuitry 336 configured to coordinate the operation of the system 300 and, in particular, to the control operation of the resource element mapper 330. The processing circuitry 336 can be realised using hardware or software or a combination of hardware and software. It will be appreciated that such processing circuitry can be an embodiment of logic. The software could be stored using a non-transitory or other non-volatile, storage such as, for example, a read-only memory or the like.

Although FIG. 3 has been described with reference to an eNB, embodiments are not limited thereto. Embodiments can additionally or alternatively be realised in the form of some other type of transmit or access point, or as a component, apparatus or system for such an eNB or other type of transmit or access point.

Figure 4:
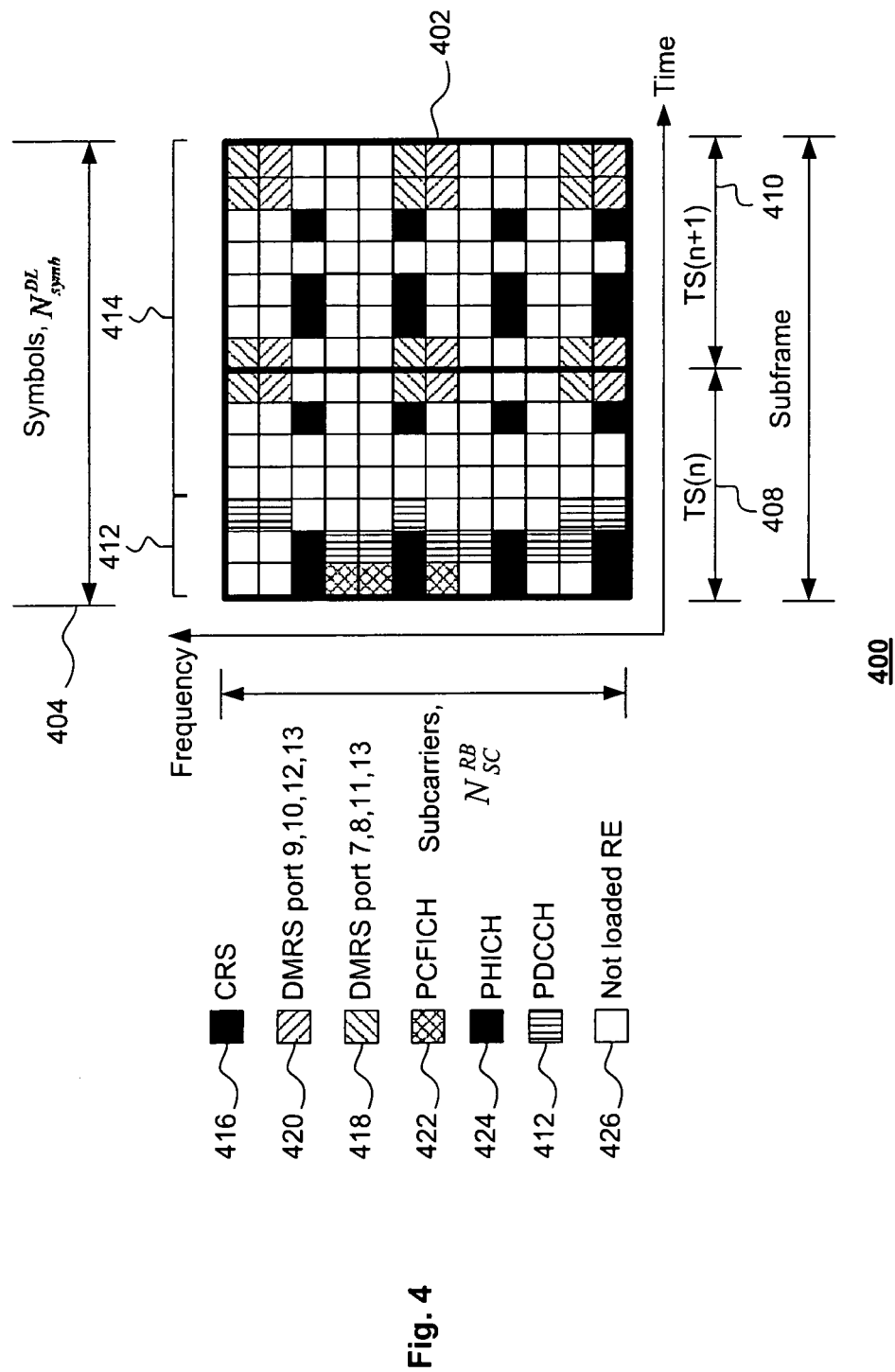
FIG. 4 depicts radio resources according to an embodiment.

FIG. 4 schematically illustrates a part of a subframe 400 such as, for example, a downlink LTE subframe or other subframe, showing, at least in part, the structure of the resource elements bearing the signals broadcast by the eNB 102. The broadcast signals could represent, for example, at least of a Physical Downlink Control Channel (PDCCH) and a Physical Downlink Shared Channel (PDSCH). An illustrative resource block 402 out of a total of $N_{RB}$ resource blocks of the subframe 400 is shown. The subframe 400 comprises a number, $N_{symb}^{DL}$, of OFDM symbols 404 along the time axis and $N_{RB}$, $N_{SC}^{RB}$ subcarriers along the frequency axis of which $N_{SC}^{RB}$ subcarriers are shown, more particularly, 12 subcarriers in the illustrated example. In the illustrated embodiment, it is assumed that normal cyclic prefixes are used such that there are fourteen symbols per subframe. Embodiment can be realised in which extended cyclic prefixes are used.

The data carried on the signal such as a PDCCH can be referred to as downlink control information. Multiple UEs can be scheduled in one subframe of a radio frame, so multiple downlink control information messages can be sent using PDCCH. The PDCCH can be designed to be demodulated based on reference signals such as cell-specific reference signals (CRS) common to an entire cell. The subframe is divided into two time slots 408, 410. The downlink channel, such as an ePDCCH, is demodulated based on the DM-RS signal.

In the illustrated embodiment, the subframe 400 comprises a set of L OFDM symbols (L=1, 2, 3) at the beginning of each subframe in a PDCCH region 412 spanning a predetermined number of OFDM symbols; a set, or width, of three OFDM symbols in this example arrangement. In other embodiments, the subframe or PDCCH transmission can use a different pattern or a different number of OFDM symbols. There is shown a PDSCH region 414 for carrying downlink data, which spans the remaining OFDM symbols of the subframe. It will be appreciated that embodiments can be realised in which some other number of OFDM symbols are used per time slot such as, for example, 6 OFDM symbols in the case of an extended cyclic prefix. The same applies to the uplink where OFDM symbols are replaced by SC-FDMA symbols, or DFT-S-OFDM symbols.

In the PDCCH region 412, as well as the PDSCH 414, other signals can be transmitted such as, for example, one or more than one of the above reference signals CRS 416 and/or DM-RS signals 418 and 420. Other control information transmitted in the PDCCH region 412 of the subframe can comprise at least one of a Physical Control Format Indicator Channel (PCFICH) 422 and a Physical Hybrid-ARQ Indicator Channel (PHICH) 424. The PCFICH 422 informs the UE 104 about the size of the control region (one, two or three OFDM symbols). There is only one PCFICH on each component carrier, i.e., in each cell. The PHICH 424 is used to signal hybrid-ARQ acknowledgements in response to uplink shared channel transmissions. Multiple PHICHs 422 can exist in each cell. The subframe can also comprises unused resource elements 426.

Embodiments are provided in which additional DM-RS ports are provided and used for higher order MU-MIMO with a larger number of UEs, such as more than 2 UEs, and/or a larger number of layers assigned per UE such as 2, 3, 4, 8 or more layers. Example implementations support higher order MU-MIMO using orthogonal and non-orthogonal DM-RS multiplexing.

For example, embodiments can be realised that use orthogonal DM-RS multiplexing for downlink transmissions with up to a predetermined number of MIMO layers for a predetermined number of UEs with use of the orthogonal DM-RS signals on a plurality of antenna ports such as, for example, antenna ports 7, 8 and 11, 13, using the associated scrambling identify, nSCID. Embodiments can be realised in which the predetermined number of MIMO layers comprises 2, 3, 4, 8, or more layers. Additionally or alternatively, embodiments can be realised in which the predetermined number of UEs is 2 or more UEs. Furthermore, the plurality of antenna ports can comprise, for example, antenna ports 7, 8, 11 and 13 taken jointly and severally in any and all permutations. Additionally, or alternatively, embodiments can be realised in which orthogonal DM-RS multiplexing is provided for downlink transmissions with one MIMO layer transmitted to a plurality of UEs such as, for example, up to four UEs, with use of the orthogonal DM-RS signals associated with prescribed antenna ports such as, for example, antenna ports 7, 8, 11, 13 using the same nSCID.

For MU-MIMO transmission with non-orthogonal DM-RS ports, the eNB 102 and the UE 104 are configurable to provide signaling of DM-RS signals via prescribed antenna ports with an nSCID being selectable to have values of 0 and 1. The prescribed antenna ports can comprise one or more than one of antenna ports 9-10. Consequently, embodiments provide non-orthogonal DM-RS multiplexing for the downlink transmission with 2 MIMO layers. Alternatively, or additionally, using non-orthogonal DM-RS antenna ports multiplexing using $n_{SCID}$=0 and 1 can be used to realise 3 and 4 MIMO layers using antenna ports 7-9 and 7-10.

Figure 5:
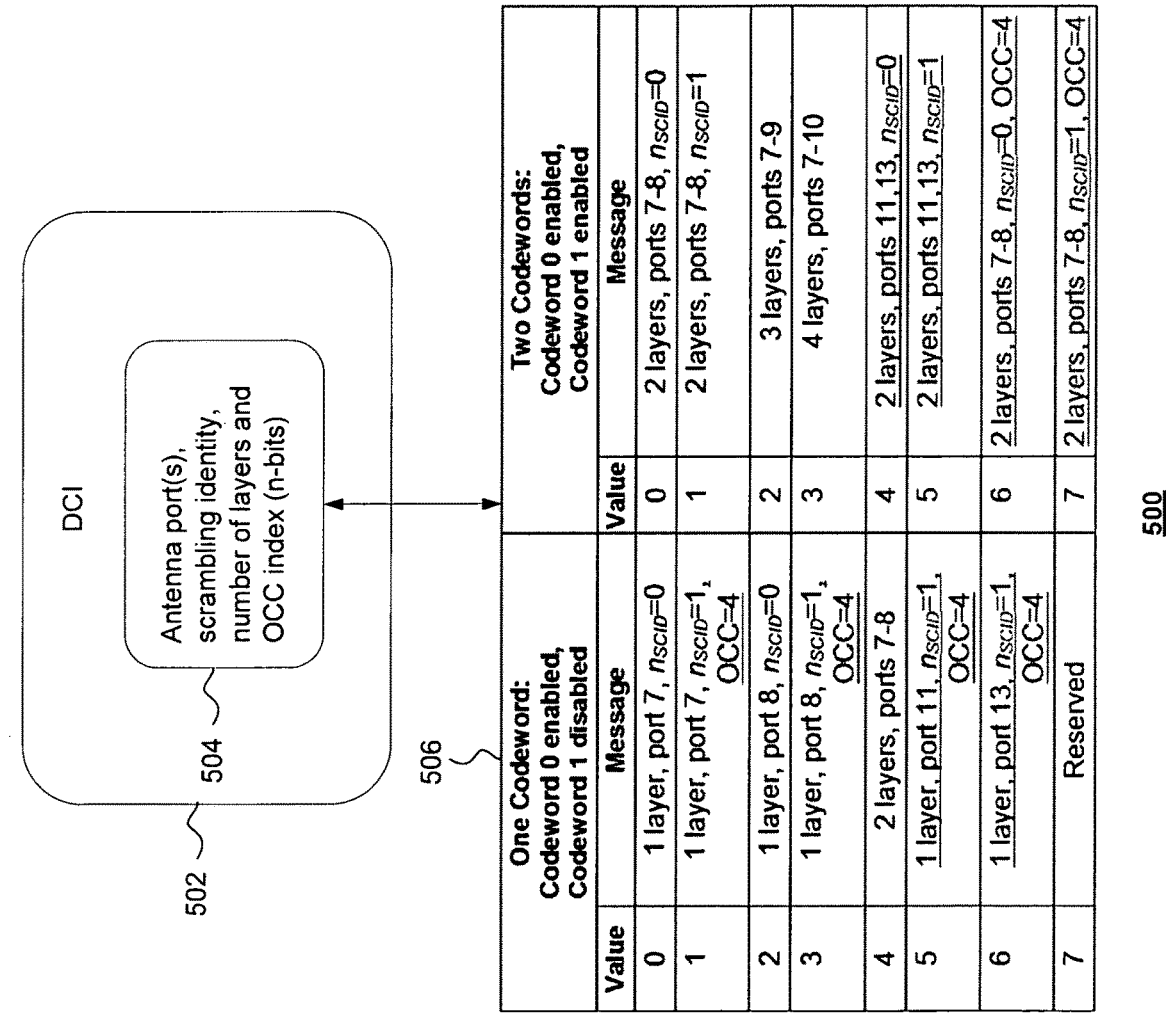
FIG. 5 shows a message according to an embodiment.

Referring to FIG. 5, there is shown a view 500 of a message 502 for communicating a prescribed configuration data to one or a plurality of UEs for use in supporting MU-MIMO communications. The message 502 is associated with configuring DM-RS transmission. The message 502 comprises an index 504 or other data associated with a number of configuration data sets or parameter sets. The configuration data sets or parameters sets can relate to at least one or more of respective antenna port(s), scrambling identity, number of layers or orthogonal cover codes taken jointly and severally in any and all permutations. The index 504 can relate to one of the values shown in the configuration table 506. Embodiments can be realised in which the configuration table 506 comprises a number of sets of configuration data or parameter sets. In the embodiment illustrated the configuration data comprises 16 sets of configuration data or 16 parameter sets. Embodiments provide one or more than one of the following higher order MU-MIMO parameter sets {1 layer, port 7, nSCID=1, OCC=4}, {1 layer, port 8, nSCID=1, OCC=4}, {1 layer, port 11 nSCID=1, OCC=4}, {1 layer, port 13, nSCID=1, OCC=4} for a one codeword case and {2 layers, ports 11,13, nSCID=0}, {2 layers, ports 11,13, nSCID=1}, {2 layers, ports 7-8, nSCID=0, OCC=4}, {2 layers, ports 7-8, nSCID=1, OCC=4} taken jointly and severally in any and all permutations. Embodiments can be provided in which further parameter sets are additionally provided. Such further parameter sets can comprise, in addition to the above parameters sets, one or more than one legacy or common parameter set such as one or more than one of the remaining parameter sets shown in the table 506 taken jointly and severally in any and all permutations inter se and jointly and severally with the above higher order parameter sets.

One skilled in the art will appreciate that communicating the length of the OCC provides a receiving UE with an indication of how to process an associated DM-RS.

Figure 6:
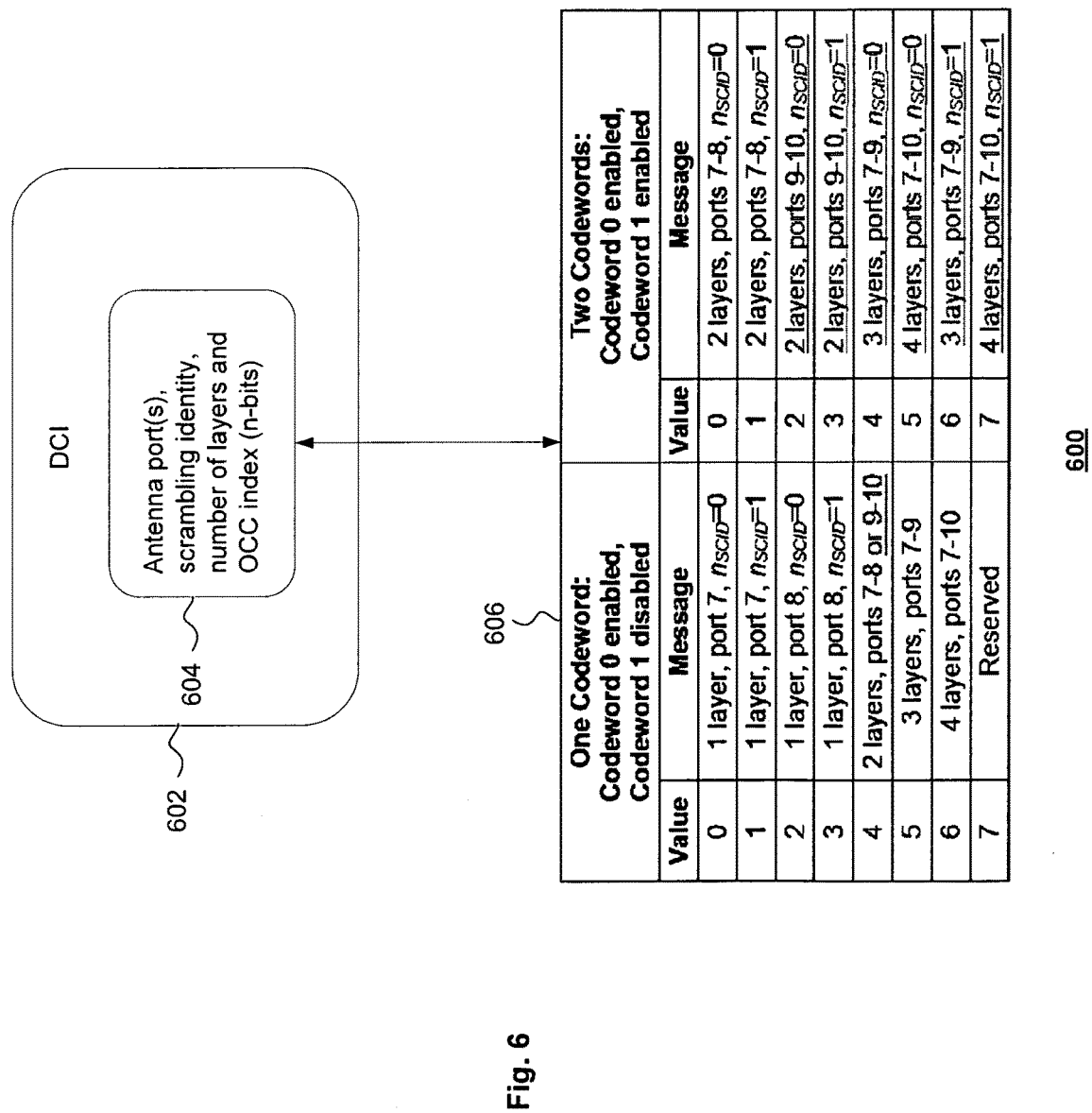
FIG. 6 illustrate a message according to an embodiment.

Referring to FIG. 6, there is shown a view 600 of a message 602 for communicating a prescribed configuration data to one or a plurality of UEs for use in supporting MU-MIMO communications. The message 602 can be associated with DM-RS transmission. The message 602 comprises an index 604 or other data associated with a number of configuration data sets or parameter sets. The configuration data sets or parameters sets can relate to at least one or more of respective antenna port(s), scrambling identity, number of layers or orthogonal cover codes taken jointly and severally in any and all permutations. The index 604 can relate to one of the values shown in the configuration table 606. Embodiments can be realised in which the configuration table comprises a number of sets of configuration data or parameter sets. In the embodiment illustrated the configuration data comprises 16 sets of configuration data or 16 parameter sets. Embodiments provide one or more than one of the following higher order MU-MIMO parameter sets {2 layers, ports 7-8 or 9-10} for a respective codeword case, such as a single codeword case, and {2 layers, ports 9-10, nSCID=0}, {2 layer, ports 9-10, nSCID=1}, {3 layers, ports 7-9, nSCID=0}, {4 layers, ports 7-10, nSCID=0}, {3 layers, ports 7-9, nSCID=1}, and {4 layers, ports 7-10, nSCID=1 taken jointly and severally in any and all permutations. Embodiments can be provided in which further parameter sets are additionally provided. Such further parameter sets can comprise, in addition to the above higher order parameters sets, one or more than one legacy or common parameter set such as one or more than one of the remaining parameter sets shown in the table 606 taken jointly and severally in any and all permutations.

Figure 7:
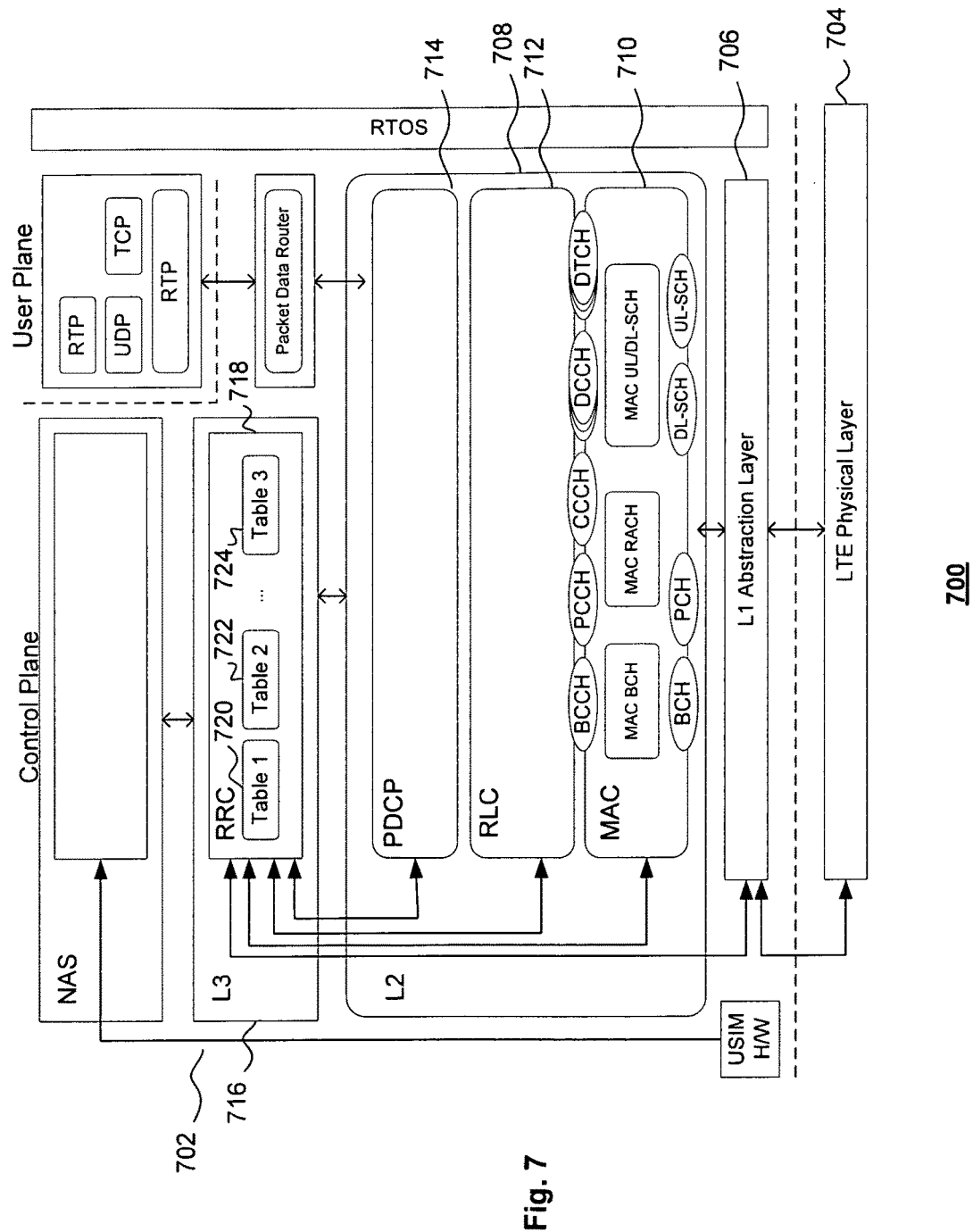
FIG. 7 depicts a protocol stack according to an embodiment.

FIG. 7 shows a view 700 of a Long Term Evolution-Advanced (LTE-A) protocol stack 702. The stack 702 comprises a physical layer 704 coupled, via an L1 abstraction layer 706, to an L2 layer 708, more particularly, to a Media Access Control (MAC) layer 710 within the L2 layer 708. The L2 layer 708 can additionally comprise a Radio Link Control (RLC) layer 712 and a Packet Data Convergence Protocol (PDCP) layer 714.

The L2 layer 708 is coupled to a higher layer. An embodiment of such a higher layer is an L3 layer 716. The L3 layer 716 can comprise a Radio Resource Control Layer (RRC) 718. The RRC 718 can control the entities of the L2 layer 708.

Such a higher layer entity, such as, for example, a L3 layer entity like the RRC 718 can be arranged to establish a desired or selectable configuration of at least one or more of antenna port(s), scrambling identity, number of layers indication or OCC, taken jointly and severally in any and all permutations as described with reference to Table 1 and 2 below or as shown in and described with reference to FIGS. 5 and 6 above for DM-RS transmissions. In the embodiment illustrated, a number of configuration tables 720 to 724 are shown. Embodiments can be provided in which the configuration tables comprise configuration data or parameters sets for indicating antenna port(s), scrambling identity, number of layers and OCC configurations taken jointly and severally in any and all permutations for DM-RS transmissions. Such tables can comprise at least one of tables 1 or 2 below or as shown in and/or described with reference to one or both of FIGS. 5 and 6. Furthermore, the tables 720 to 724 can comprise a legacy table such as, for example, Table 5.3.3.1.5C-1 as defined in 3GPP TS 36.212 V12.6.0 (2015-09) or earlier Technical Standard. Suitably, embodiments can be provided in which the configuration tables 720 to 724 comprises such a legacy table as a first table 718 and one or more of tables 1 and 2 as further tables 720 and 722. Although the embodiment illustrated uses 3 table, embodiments are not limited to such an arrangement. Embodiments can be realised that use two or more tables such as, for example, a legacy table and one of tables 1 and 2. Furthermore, embodiments can be realised that a plurality of tables.

The L3 or RRC reconfiguration of the table used for indicating antenna port(s), scrambling identity, number of layers and OCC indication may introduce an ambiguity period relating to an assumption regarding the prevailing parameter set or table at the UE, particularly when following a reconfiguration associated with changing the antenna port(s), scrambling identity, number of layers and OCC configuration for DM-RS transmission. Due to such an ambiguity, during the re-configuration period, embodiments provide for the eNB 102 transmitting to the UE 104 using a common or legacy parameter sets. Therefore, for example, during such an ambiguity period, the eNB 102 may transmit a PDSCH modulated with a single layer CRS transmission scheme scheduled by DCI formats 1A or 1C. Such transmission schemes are not efficient in terms of the downlink throughput performance.

Embodiments can be realised with a reduced RRC re-configuration ambiguity. For example, embodiments can be realised in which a new configuration table uses the same number of bits a legacy table relating to antenna port(s), scrambling identity or number of layers configuration. The reduced ambiguity can, additionally or alternatively, be provided by having or retaining some common entries as between tables according to embodiments and the legacy tables. For example, embodiments can be realised in which legacy table entries are replaced with new parameter sets associated with MU-MIMO DM-RS signalling. An example implementation of such a desired or selectable configuration is shown below in Table 1, where a predetermined number of bits are provided for indicating such antenna port(s), scrambling, number of layers and OCC. Embodiments can be realised in which the predetermined number of bits for indicating antenna port(s), scrambling identity, number of layers indication and OCC is kept the same as in the above 3GPP TS 36.212 V12.6.0 (2015-09).

TABLE 1

Antenna port(s), scrambling identity
and number of layers indication table

| One Codeword:<br>Codeword 0 enabled,<br>Codeword 1 disabled | | Two Codewords:<br>Codeword 0 enabled,<br>Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ |

In other embodiments, DM-RS ports 7, 8, 11 and 13 can be used to support higher order MU-MIMO. The example of an alternative table in accordance with an embodiment is provided in Table 2, where the number of bits for signalling the MIMO layers is maintained at 3 bits, which is the same as in Rel-10. In the considered example, to support indicating the additional DM-RS ports for MU-MIMO, some of the entries corresponding to SU-MIMO parameter sets with more than 4 MIMO layers were removed and replaced with the MU-MIMO parameter sets.

TABLE 2

Antenna port(s), scrambling identity, number
of layers and OCC indication table

| One Codeword:<br>Codeword 0 enabled,<br>Codeword 1 disabled | | Two Codewords:<br>Codeword 0 enabled,<br>Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10 |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |

TABLE 2-continued

Antenna port(s), scrambling identity, number
of layers and OCC indication table

| One Codeword:<br>Codeword 0 enabled,<br>Codeword 1 disabled | | Two Codewords:<br>Codeword 0 enabled,<br>Codeword 1 enabled | |
|---|---|---|---|
| Value | Message | Value | Message |
| 7 | Reserved | 7 | 2 layers, ports 7-8, $n_{SCID} = 1$, OCC = 4 |

It should be noted that processing antenna ports 7 and 8 in conventional systems assumes OCC processing with minimum length of 2. However, to support additional DM-RS antenna ports 11 and 13 for MU-MIMO, embodiments can use an OCC processing of length 4. Therefore, as a part of a MIMO layer indication, signalling of a desired, such as a minimum, OCC processing length for DM-RS ports 7 and 8 can be provided, as also shown in Table 2. It will be appreciated that embodiments extend DM-RSs for UEs in a manner to manage, such as, reduce, mutual interference as between DM-RS ports. Consequently, an eNB, such as the above described eNB 102, can increase the number of non-interfering DM-RS ports for MU-MIMO such as, for example, an increased number of orthogonal DM-RS ports for MU-MIMO or an increased number of DM-RS ports for MU-MIMO that are associated with non-interfering antenna beams or patterns.

Enabling of the alternative antenna port(s), scrambling identity, number of layers and OCC indication per Table 2 can be facilitated by using higher layer configuration similar to higher layer configuration of the alternative MCS table specified in Rel-12 for 256QAM. Configuration of the alternative table should be applicable to both TM9 and TM10, where for TM9 the enabling should be facilitated on a per cell basis and for TM10 per different PDSCH resource elements mapping and quasi co-location indication (PQI) state to support dynamic switching between the legacy antenna ports and alliterative antenna port(s), scrambling identity and number of layers indication table. An example of the RRC signalling for PQI configuration is provided below, where alternativeUeRsAntPortMapping-r13 BOOLEAN filed is used to indicate new or legacy table for each state:

The IE PDSCH-ConfigCommon and the IE PDSCH-ConfigDedicated can be used to specify the common and the UE specific PDSCH configuration respectively.

| PDSCH-Config information element |
|---|
| ```
-- ASN1START
PDSCH-RE-MappingQCL-Config-r11 ::=      SEQUENCE {
    pdsch-RE-MappingQCL-ConfigId-r11        PDSCH-RE-MappingQCL-ConfigId-r11,
    optionalSetOfFields-r11                 SEQUENCE {
        crs-PortsCount-r11                      ENUMERATED {n1, n2, n4, spare1},
        crs-FreqShift-r11                       INTEGER (0..5),
        mbsfn-SubframeConfigList-r11            CHOICE {
            release                                 NULL,
            setup                                   SEQUENCE {
                subframeConfigList                      MBSFN-
SubframeConfigList
            }
        }                                       OPTIONAL,
        pdsch-Start-r11                         ENUMERATED {reserved, n1, n2, n3, n4,
assigned}
    }                                       OPTIONAL,
    csi-RS-ConfigZPId-r11                   CSI-RS-ConfigZPId-r11,
    qcl-CSI-RS-ConfigNZPId-r11              CSI-RS-ConfigNZPId-r11
``` |

| PDSCH-Config information element |
|---|
| alternativeUeRsAntPortMapping-r13       BOOLEAN |
| -- ASN1STOP |

The field "alternativeUeRsAntPortMapping-r13" of the above information element provides can indication of which table or configuration set, parameter set, should be used to decode the PDSCH according to a DCI transmitted by the PDCCH/EPDCCH. Although the embodiment shown above depicts "alternativeUeRsAntPortMapping-r13" as a Boolean type, embodiments are not limited thereto. Embodiments can be realised in which "alternativeUeRsAntPortMapping-r13" is some other type, such as, for example, an integer or enumerated type, which would support using a plurality of such tables with different or respective parameter sets The field pdsch-RE-MappingQCL-ConfigId-r11 can be used when a UE is configured by higher layer signalling to receive PDSCH data transmissions in a respective transmission mode such as TM10 or other transmission mode to indicate the parameter set prescribed by a higher layer for determining resource element mapping and quasi-co-location antenna port mappings.

It will be appreciated that MU-MIMO can be realised using numerous combinations at least two or more than two of the parameter sets or configuration data expressed in at least one of tables 1 and 2 when assigned to respective UEs. For example, referring to table 1, MU-MIMO could be realised in the following situations:

1. A first UE may be scheduled with '2 layers, ports 7-8, nSCID=0' and second UE may be scheduled with '2 layers, ports 9-10, nSCID=0', which would result in two 2 UEs operating in a MU-MIMO environment with orthogonal DM-RS ports and rank 2 transmissions per UE;

2. A first UE may be scheduled using parameter set '2 layers, ports 9-10, nSCID=0', a second UE may be scheduled with '2 layers, ports 9-10, nSCID=1', a third UE may be scheduled with '2 layers, ports 7-8, nSCID=0' and fourth UE may be scheduled with '2 layers, ports 7-8, nSCID=1', which would produce a MU-MIMO environment of 4 UEs with rank 2 transmissions per each UE;

3. A first UE may be scheduled with '3 layers, ports 7-9, nSCID=0' and a second 2nd UE may be scheduled with '3 layers, ports 7-9, nSCID=1', which creates a MU-MIMO environment of 2 UEs with rank 3 transmissions per each UE; and 4. A first UE may be scheduled with '4 layers, ports 7-9, nSCID=0' and a 2nd UE may be scheduled with '4 layers, ports 7-9, nSCID=1' to produce a MU-MIMO environment of 2 UEs with rank 4 transmissions per each UE.

Other combinations can be realised for producing a MU-MIMO environment. Embodiments, therefore, can comprise any and all combinations of the entries of at least table 1.

Similarly, referring to table 2, various MU-MIMO environments can be realised. For example:

1. A first UE may be scheduled with a parameter set of '2 layers, ports 7-8, $n_{SCID}$=0, OCC=4' and a second UE may be scheduled with a parameter set of '2 layers, ports 11,13, $n_{SCID}$=0', which would give a 2 UE MU-MIMO arrangement with orthogonal DM-RS ports and rank 2 transmissions per each UE; and 2. A first UE may be scheduled with '2 layers, ports 11,13, $n_{SCID}$=0', a second UE may be scheduled with '2 layers, ports 11,13, $n_{SCID}$=1', a third UE may be scheduled with 2 layers, ports 7-8, $n_{SCID}$=0 and fourth UE may be scheduled with '2 layers, ports 7-8, $n_{SCID}$=1' resulting in a MU-MIMO environment of 4 UEs with rank 2 transmissions per each UE.

Other combinations can be realised for producing a MU-MIMO environment. Embodiments, therefore, can comprise any and all combinations of the entries of at least table 2.

The parameter sets expressed in tables 1 and 2 can be combined into a single table.

In accordance with the existing specification, the ratio of PDSCH EPRE to DM-RS EPRE within each OFDM symbol containing DM-RS is 0 dB for a number of transmission layers less than or equal to two. Given that PDSCH and DM-RS with new DM-RS antenna ports 7, 8, 11 and 13 are relying on code multiplexing, the power ratio between PDSCH and a UE-specific RS should be kept to 0 dB. However, multiplexing of the DM-RS ports 7, 8, 11 and 13 may require power pooling at the eNB to support the increased transmission power on some of the OFDM symbols containing DM-RS. The power pooling at the eNB may not be always desirable from a practical perspective. Therefore, higher layer configuration of the power de-boosting for DM-RS antenna ports (e.g. equal to −1 dB) may be used to reduce any impact on the power amplifier design.

Figure 8:
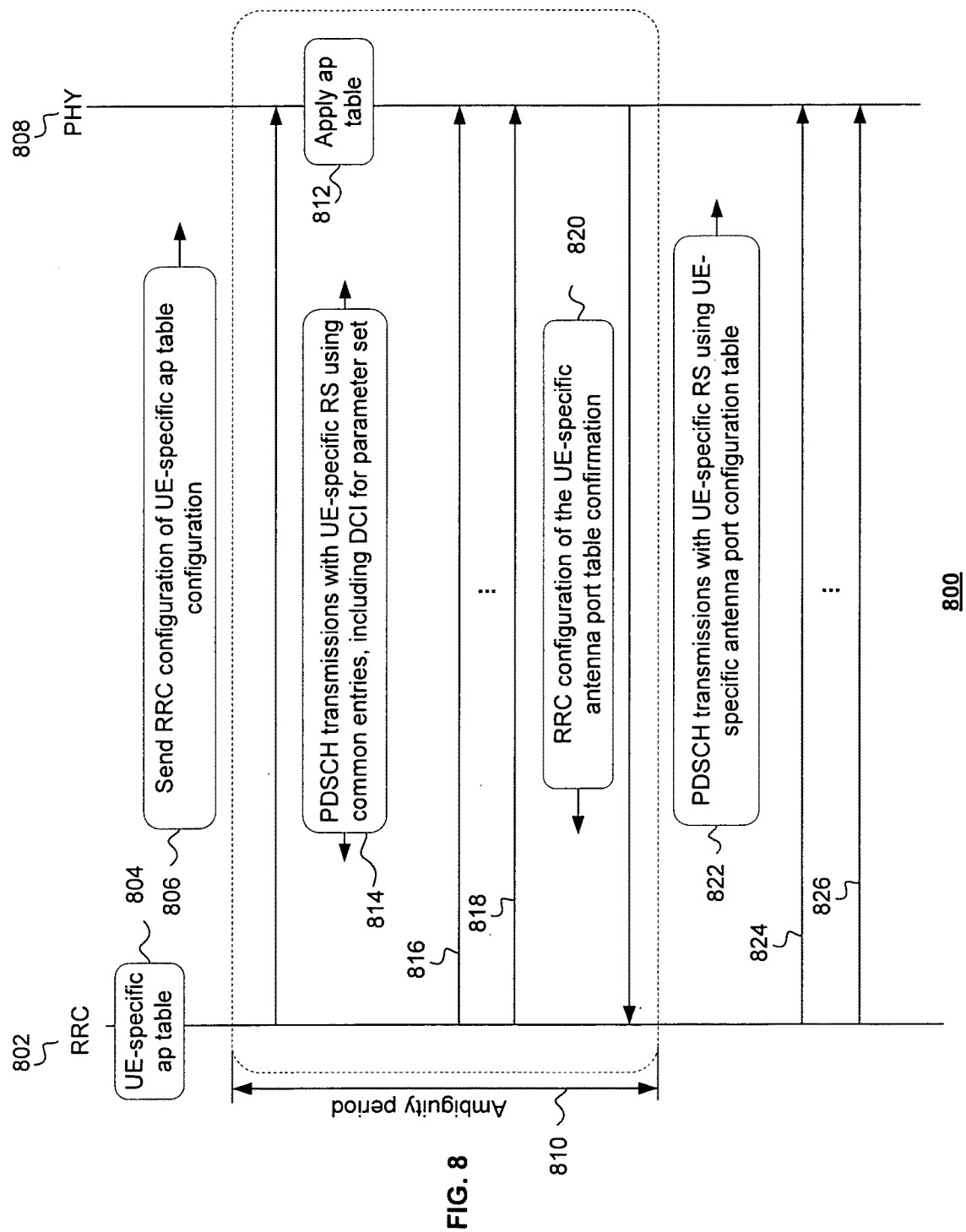
FIG. 8 illustrates a protocol exchange according to an embodiment.

Referring to FIG. 8, there is shown a view 800 of a process for configuring a UE such as, for example, one or more of the UEs 104, 202 described in this application. The UE 104 can be configured to assume a selected configuration state of a plurality of configuration states or parameter sets. The configuration states are associated with sets of configuration data. Tables 1 and 2 above are examples of such sets of configuration data with the entries being examples of such parameter sets or such configuration data/states.

One or more than one of the sets of configuration data can comprise first configuration data and second configuration data. The first configuration data can comprise a first set of configurations or parameter sets associated with a plurality of configurations of at least one of antenna ports, UE-specific reference signals, scrambling identities, number of layers or associated orthogonal cover codes taken jointly and severally in any and all permutations. The second configuration data can comprise a second set of configurations or parameter sets associated with a plurality of configurations of at least one of antenna ports, UE-specific reference signals, scrambling identities, number of layers or associated orthogonal cover codes taken jointly and severally in any and all permutations. The first and second configuration data can share or comprise common configuration data comprising at least one configuration associated with at least one of antennas ports, UE-specific reference signals, number of layers, scrambling identities or associated orthogonal codes taken jointly and severally in any and all permutations. Embodiments can be realized in which the UE-specific reference signals are DM-RS signals.

An RRC 802, decides that the configuration state of the UE 104 should change from a present configuration, such as a first configuration state, to a further configuration, such as a second configuration state. The RRC 718 is an example of such an RRC 802 described with reference to FIG. 7. The RRC 802 selects a desired or target configuration table 804 for the UE 104; such as one of tables 1 and 2. Data 806 is sent to the physical layer 808 of the UE associated with the target configuration table. The data 806 can take the form of an index associated with the tables; the index being used to identify or otherwise select the target configuration state, a target configuration table or a parameter set from such a target configuration table taken jointly and severally in any and all permutations.

The physical layer 808 of the UE 104 receives the data 806 and initiates or reconfiguration in response to the data 806. In example implementations where the RRC 802 is associated with an eNB, then the UE 104 passes the data 806 to a higher layer for processing. Such a higher layer could be the RRC 718 of the UE.

Giving effect to the data 806 takes finite period of time that can create or have associated with it an ambiguity period 810, that is, the eNB or RRC 802 cannot be certain that the configuration state of the UE has changed in response to the data 806. Therefore, the RRC 802 cannot instruct a lower layer, such as the MAC layer or PHY layer, to use one of the sets of configurations associated with the target configuration 804.

Therefore, the UE 104 is arranged to adopt a common configuration associated with the above common configuration data. During the ambiguity period, communications such as, for example, the PDSCH and/or PUSCH can continue using the common configuration data. The common configuration state can be a continuation of a current configuration state.

The UE 104 initiates reconfiguration based on the configuration data at 812 and, pending completing the reconfiguration from a current configuration state to a target configuration state, commences or continues processing signals 814 according to the common configuration data. Having selected a table, a parameter set from within the table can be prescribed for a UE via an index associated with an index 'value' for each entry. The index can be provided in 814 via a DCI message such as, for example, one or more of the messages shown in and described with reference to FIGS. 5 and 6. Signals 816 and 818 are intended to be indicative of one or more transmissions associated with the common configuration data. Example implementations are provided in which the UE processes the received signals, pending switching to the second configuration state, using a common configuration state comprising common configuration data associated with both the first and second configuration data.

Upon completing the reconfiguration in response to the data 806, the UE 104 can output an indication 820 to that effect to the RRC 802. The indication can comprise an RRC reconfiguration complete message. Alternatively, or additionally, the RRC 802 can merely continue to use the common configuration data for a period not less than the duration of the ambiguity period and then, following the ambiguity period, switch to the target configuration on the assumption that the UE will have had sufficient time to receive the reconfiguration message and complete reconfiguration in response to the reconfiguration message.

Thereafter, subsequent transmissions such as one or more than one of the transmissions 824 and 826 shown in FIG. 8, can use one of the sets of configuration data or parameter sets associated with the target configuration.

The configuration data such as, for example, the target configuration data can comprise data of, or representing, one or more of the above tables such as Table 1 or Table 2. The reconfiguration data 806 can comprise an index representing or associated with the value to allow the RRC or UE to reconfigure the antenna port(s), scrambling identity, number of layers and OCC indication as dictated by the index. The index can be represented in a predetermined format such as, for example, a predetermined number of bits. For example, the value or index associated with accessing the entries of tables 1 or 2 could be represented using three bits, or three bits of a larger number of bits. If the number of antenna port(s), scrambling identity, OCC and number of layers indication permutations increases, then a greater number of bits can be allocated for indexing those antenna port(s), scrambling identity, OCC and number of layers indication permutations taken jointly and severally in any and all permutations.

It will be appreciated that tables 1 and 2 have sets of configuration data that are common to both at least one of both tables 1 and 2 and legacy tables.

Example implementations can be realised in which the configuration data is only partially replaced or updated. For example, it can be seen that a switch between configuration tables such as, for example, switching between the above legacy table and at least one of configuration data represented by table 1 or configuration data represented by table 2, can be realised by updating selected entries. Assuming that a current configuration data for a UE is represented by a legacy table, it can be appreciated that a change in configuration data to that expressed by table 1 would retain common configuration data associated with selected or predetermined entries, such as, for example, table entries associated with values 0 to 3 and 5 to 7, which would remain unchanged for the single codeword case and values 1 and 2 would remain the same for the dual codeword case. The foregoing unchanged entries are examples of common configuration data. Such common configuration data can be used as the basis for supporting continuing UE-specific transmissions such as, for example, DM-RS transmissions. Continuing to support such transmissions during the ambiguity period advantageously supports continued data exchanges with the UE, that is, the integrity of at least one of the PDSCH or PUSCH is preserved during reconfiguration. Similarly, such common configuration data associated with a switch from the above legacy table to the configuration data of table 2 would retain entries associated with values 0, 2, 4 and 7 for the single codeword case and entries 0 to 3 for the multi-codeword case. Again, such retained entries can be used as a basis for continued support of the PDCCH or PDSCH, or both, during reconfiguration.

Figure 9:
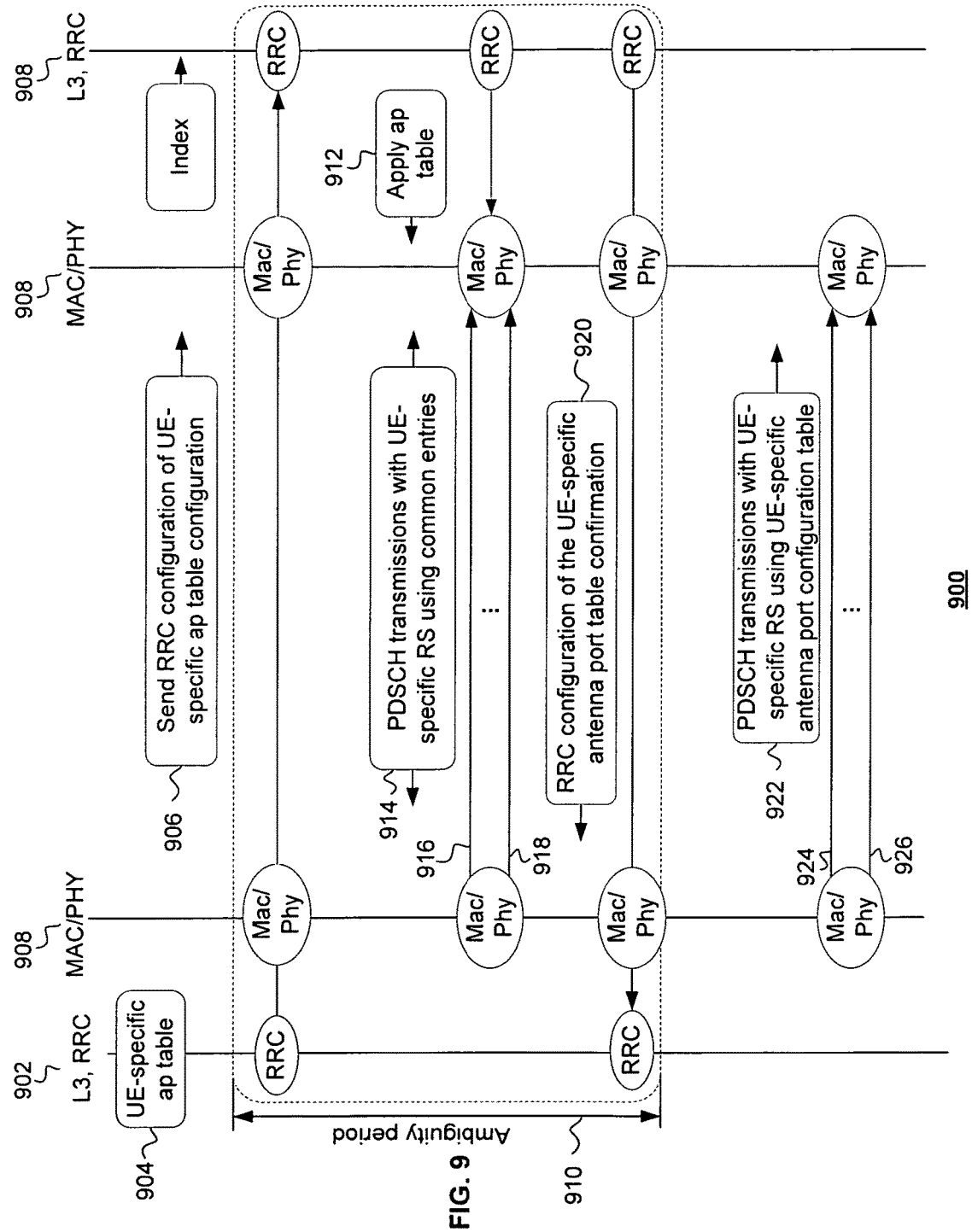
FIG. 9 shows a protocol exchange according to an embodiment.

Referring to FIG. 9, there is shown a view 900 of a process for configuration a UE such as, for example, one or more of the UEs 104, 202 described in this application. The UE 104 can be configured to assume a selected configuration table comprising a plurality of configuration states or parameter sets. The parameter sets of configuration data can comprise first configuration data and second configuration data. The first configuration data can comprise a first set of configurations associated with a plurality of configurations of at least one of antenna ports, UE-specific reference signals, number of layers, scrambling identities or associated orthogonal cover codes taken jointly and severally in any and all permutations. The second configuration data can comprise a second set of configurations associated with a plurality of configurations of at least one of antenna ports, UE-specific reference signals, number of layers, scrambling code identities or associated orthogonal cover codes taken jointly and severally in any and all permutations. The first and second configuration data can share common configuration data comprising at least one configuration associated with at least one of antennas ports, UE-specific reference signals, number of layers, scrambling code identities or associated orthogonal cover codes taken jointly and severally in any and all permutations.

An RRC 902 decides that the configuration state of the UE 104 should change from a present configuration, such as a first configuration state, to a further configuration, such as a second configuration state. The RRC 902 selects a desired or target configuration state 904 for the UE 104. Data 906, associated with the target configuration, is sent to the physical layer 908 of the UE. The data 906 can take the form of an index associated with the plurality of configuration states; the index being used to identify or otherwise select a target configuration state.

The physical layer 908 of the UE 104 receives the data 906 and initiates or commences reconfiguration in response to the data 906. In example implementations where the RRC 902 is associated with an eNB, the UE 104 passes the data 906 to a higher layer for processing. Such a higher layer could be the RRC of the UE.

Giving effect to the data 906 will take a finite period of time that can create or have associated with it an ambiguity period 910, that is, the eNB or RRC 902 cannot be certain that the configuration state of the UE has changed in response to the data 906. Therefore, the RRC 902 cannot instruct a lower layer, such as the MAC layer or PHY layer, to use one of the sets of configurations associated with the target configuration.

Therefore, the UE 104 is arranged to adopt a common configuration associated with the above common configuration data. During the ambiguity period, communications such as, for example, the PDSCH and/or PUSCH can continue using the common configuration data. The common configuration state can be a continuation of a current configuration state.

The UE 104 initiates reconfiguration based on the configuration data at 912 and, pending completing the reconfiguration from a current configuration state to a target configuration state, commences or continues processing signals 914 according to the common configuration data. Signals 916 and 918 are intended to be indicative of one or more transmissions associated with the common configuration data. Example implementations are provided in which the UE processes the received signals, pending switching to the second configuration state, using a common configuration state comprising common configuration data associated with both the first and second configuration data.

Upon completing the reconfiguration in response to the data 906, the UE 104 outputs an indication 920 to that effect to the RRC 902. The indication can comprise an RRC reconfiguration complete message. Alternatively, or additionally, the RRC 902 can merely continue to use the common configuration data for a period not less than the duration of the ambiguity period and then, following the ambiguity period, switch to the target configuration on the assumption that the UE will have had sufficient time to receive the reconfiguration message and complete reconfiguration in response to the reconfiguration message.

Thereafter, subsequent transmissions such as one or more than one of the transmissions 924 and 926 shown in FIG. 9, can use one of the sets of configuration data or parameters associated with the target configuration.

The configuration data such as, for example, the target configuration data can comprise data of one or more of the above tables such as Table 1 or Table 2 when, for example, switching from the configuration data associated with the above legacy table or some other table, legacy or otherwise.

The reconfiguration data 906 can comprise an index representing or associated with the value to allow the RRC or UE to reconfigure the antenna port(s), scrambling identity, number of layers and OCC indication according as dictated by the index. The index can be represented in a predetermined format such as, for example, a predetermined number of bits. For example, the value or index associated with tables 1 and 2 could be represented using three bits, or three bits of a larger number of bits. If the number of antenna port(s), scrambling identity, number of layers and OCC indication permutations increases, then a greater number of bits can be allocated for indexing those antenna port(s), scrambling identity, number of layers and OCC indication permutations.

It will be appreciated that tables 1 and 2 have sets of configuration data that are common to both a legacy table at least one of both tables 1 and 2.

Example implementations can be realised in which the configuration data is only partially replaced or updated. For example, it can be seen that a switch between configuration tables such as, for example, switching between the above mentioned legacy table and at least one of configuration data represented by table 1 and configuration data represented by table 2, can be realised by updating selected entries. Assuming that a current configuration data for a UE is represented by a legacy table, it can be appreciated that a change in configuration data to that expressed by table 1 would retain common configuration data associated with selected or predetermined entries, such as, for example, table entries associated with values 0 to 3 and 5 to 7 that would remain unchanged for the single codeword case and values 1 and 2 that would remain the same for the dual codeword case. The foregoing unchanged entries are examples of common configuration data. Such common configuration data can be used as the basis for supporting continuing UE-specific transmissions such as, for example, DM-RS transmissions. Continuing to support such transmissions during the ambiguity period advantageously supports continued data exchanges with the UE, that is, the integrity of at least one of the PDSCH or PUSCH is preserved during reconfiguration. Similarly, such common configuration data associated with a switch from the above legacy table to the configuration data of table 2 would retain entries associated with values 0, 2, 4 and 7 for the single codeword case and entries 0 to 3 for the multi-codeword case.

Figure 10:
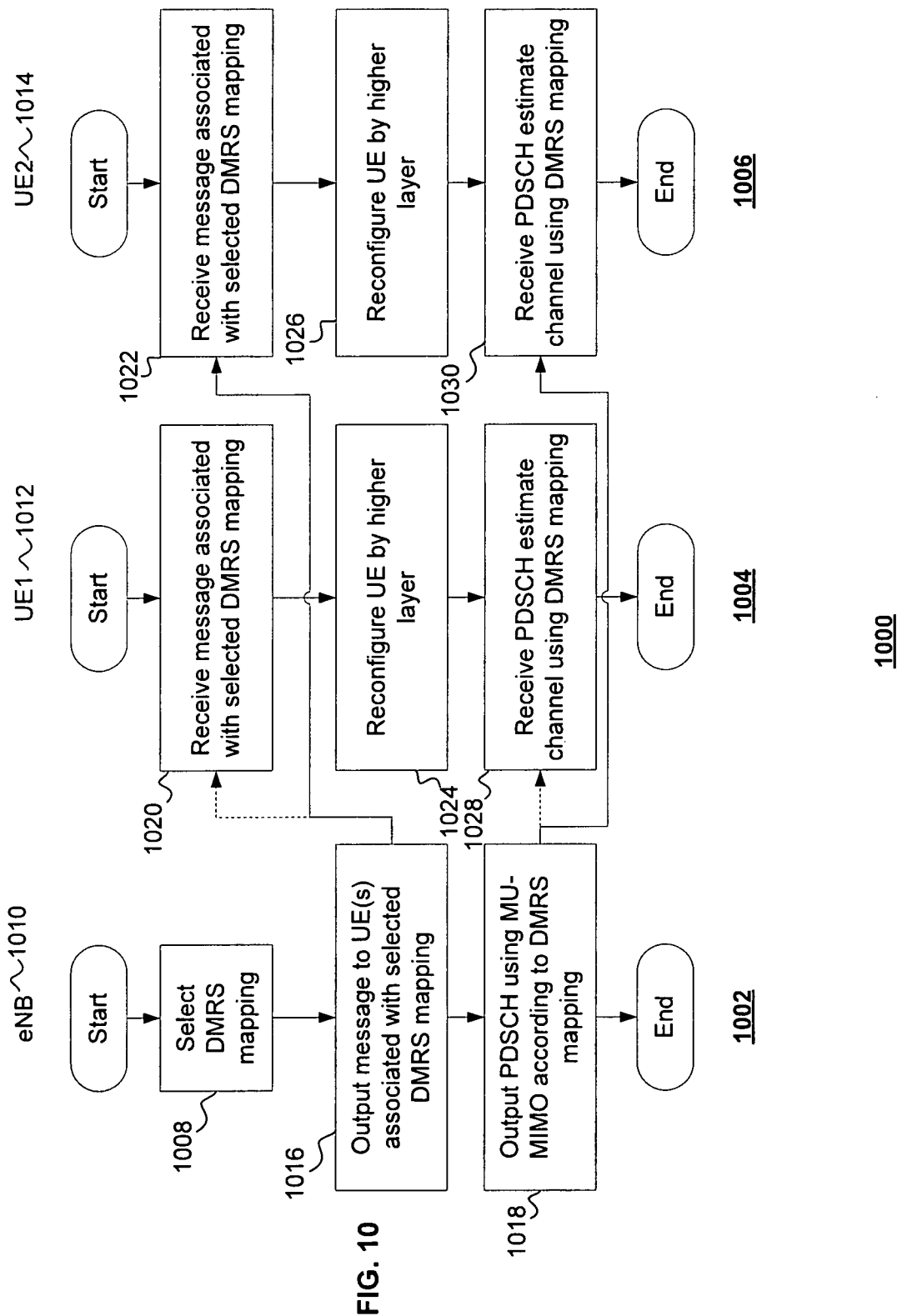
FIG. 10 depicts a number of flowcharts according to embodiments.

Referring to FIG. 10, there is shown a view 1000 of flowcharts 1002, 1004 and 1006 of embodiments for configuring at least one pair of UEs to operate in a MU-MIMO manner according to a target or desired antenna port(s), scrambling ID(s), number of layers and OCCs configuration data or parameter sets as follows:

At 1008, an eNB 1010, which can be the above eNB 102, configures or selects an alternative DM-RS port mapping table for a first UE 1012 (UE1) and a second UE 1014 (UE2) using higher layer signaling such as, for example, RRC signalling;

The eNB 1010 transmits, at 1016, a message such as, for example, a DCI message or messages, indicating a prescribed table or tables containing one or more than one configuration or parameter sets such as for example, a message indicating DM-RS ports 7 and 8 with OCC=4 processing, to the first UE (UE1) and a message, such as a DCI message, indicating DM-RS ports 11 and 13 to the second UE (UE2).

At 1018, the eNB transmits the PDSCH using MU-MIMO with prescribed MIMO layers, such as, for example, the first two MIMO layers, being transmitted on DM-RS ports 7, 8 designated to the first UE1 and the other MIMO layers, such as, for example, second MIMO layers, using DM-RS ports 11, 13 to the second UE, according to the selected DM-RS mapping, that is, configuration table.

At 1020 and 1022, each UE 1012 and 1014 receives the message associated with the selected DM-RS mapping and is reconfigured, at 1024 and 1026, by a higher layer, that Layer 3 or above, such as, for example, the RRC layer, to operate according to the DM-RS mapping.

At 1028 and 1030, each UE can receive and decode their prescribed DM-RS signals in accordance with the configuration parameters or DM-RS mapping prescribed by the eNB 1010 and use their respective DM-RS signals to estimate their corresponding channels. For example, UE1 estimates its respective channel using the DM-RS signals carried by resource elements associated with DM-RS ports 7 and 8 using OCC=4 processing and UE2 estimates its respective channel using DM-RS signals carried by resource elements associated with DM-RS ports 11 and 13.

Thereafter, each UE demodulates the received PDSCH.

Figure 11:
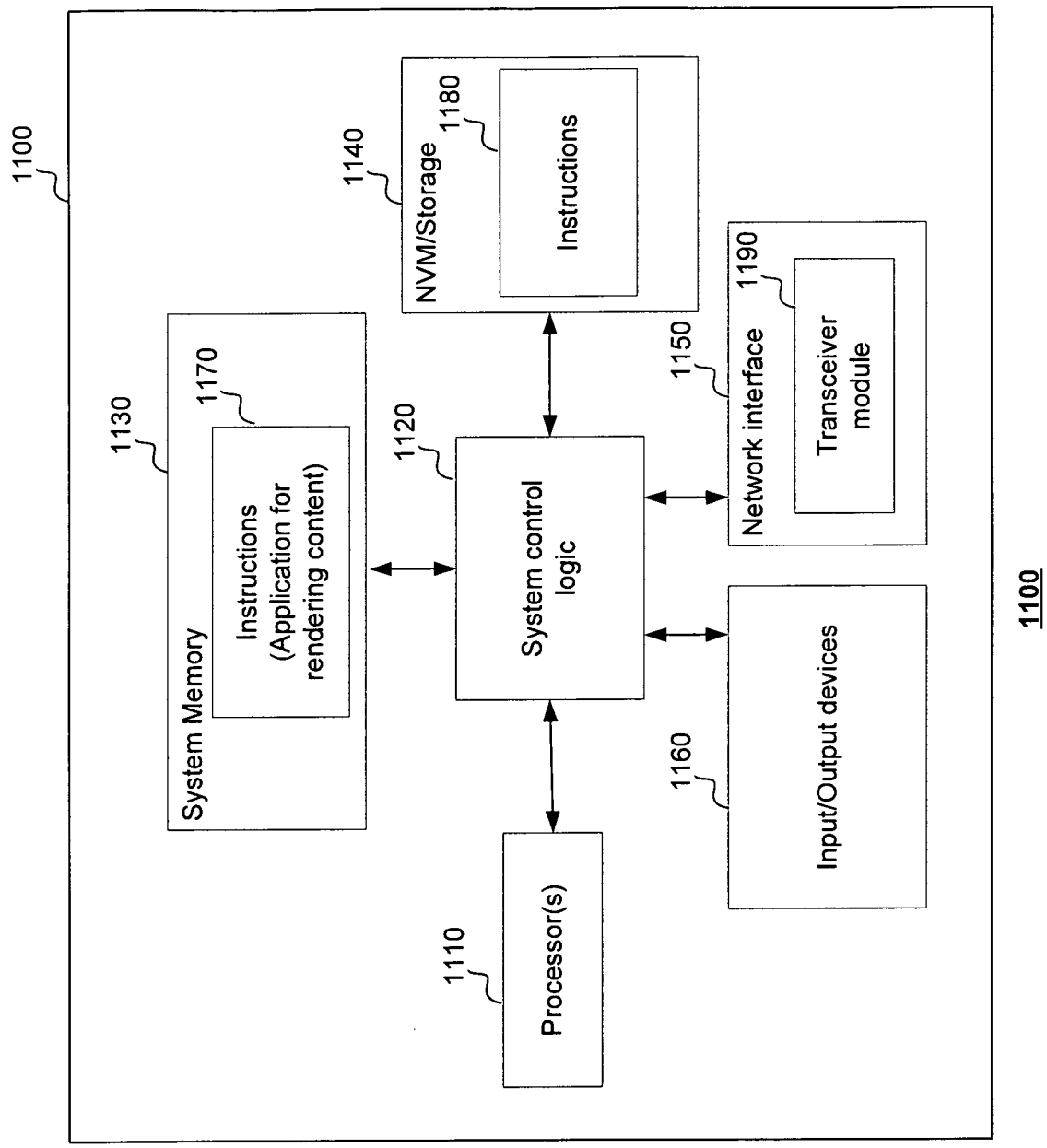
FIG. 11 illustrates a system according to an embodiment.

FIG. 11 illustrates, for one embodiment, an example system 1100 for realizing a UE 104 or component thereof, 202, as described above with reference to FIGS. 2 and 10 taken jointly and severally. The system 1100 comprises one or more processor(s) 1110, system control logic 1120 coupled with at least one of the processor(s) 1110, system memory 1130 coupled with system control logic 1120, non-volatile memory (NVM)/storage 1140 coupled with system control logic 1120, and a network interface 1150 coupled with system control logic 1120. The system 1100 control logic 1120 may also be coupled to Input/Output devices 1160. The system can be arranged to receive and process one or more than one instance of the above tables to realize orthogonal and non-orthogonal DM-RS signalling and/or a MU-MIMO system.

Processor(s) 1110 may include one or more single-core or multi-core processors. Processor(s) 1110 may include any combination of general-purpose processors and/or dedicated processors (e.g., graphics processors, application processors, baseband processors, etc.). Processors 1110 may be operable to carry out the above described methods using suitable instructions or programs (i.e. to operate via use of processor, or other logic, instructions). The instructions may be stored in system memory 1130, as system memory instructions 1170, or, additionally or alternatively, may be stored in (NVM)/storage 1140, as NVM instructions 1180.

System control logic 1120, for one embodiment, may include any suitable interface controllers to provide for any suitable interface to at least one of the processor(s) 1110 and/or to any suitable device or component in communication with system control logic 1120.

System control logic 1120, for one embodiment, may include one or more memory controller(s) to provide an interface to system memory 1130. System memory 1130 may be used to load and store data and/or instructions for the system 1100. A system memory 1130, for one embodiment, may include any suitable volatile memory, such as suitable dynamic random access memory (DRAM), for example.

NVM/storage 1140 may include one or more than one tangible, non-transitory computer-readable medium used to store data and/or instructions, for example. NVM/storage 1140 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1140 may include a storage resource that is physically part of a device on which the system 1100 is installed or it may be accessible by, but not necessarily a part of, the system 1100. For example, the NVM/storage 1140 may be accessed over a network via the network interface 1150.

System memory 1130 and NVM/storage 1140 may respectively include, in particular, temporal and persistent, that is, non-transient, copies of, for example, the instructions 1170 and 1180, respectively. Instructions 1170 and 1180 may include instructions that when executed by at least one of the processor(s) 1110 result in the system 1100 implementing the processing of the method(s) of any embodiment described herein or as shown in any of the figures. In some embodiments, instructions 1170 and 1180, or hardware, firmware, and/or software components thereof, may additionally/alternatively be located in the system control logic 1120, the network interface 1150, and/or the processor(s) 1110.

Network interface 1150 may have a transceiver module 1190 to provide a radio interface for system 1100 to communicate over one or more network(s) (e.g. wireless communication network) and/or with any other suitable device. The transceiver 1190 may implement receiver module that performs the above processing of the received signals to realize interference mitigation. In various embodiments, the transceiver 1190 may be integrated with other components of the system 1100. For example, the transceiver 1190 may include a processor of the processor(s) 1110, memory of the system memory 1130, and NVM/Storage of NVM/Storage 1140. Network interface 1150 may include any suitable hardware and/or firmware. Network interface 1150 may be operatively coupled to the antenna, or to one or more than one antenna to provide SISO or a multiple input, multiple output radio interface. Network interface 1150 for one embodiment may include, for example, a network adapter, a wireless network adapter, a telephone modem, and/or a wireless modem.

For one embodiment, at least one of the processor(s) 1110 may be packaged together with logic for one or more controller(s) of the system control logic 1120. For one embodiment, at least one of the processor(s) 1110 may be packaged together with logic for one or more controllers of the system control logic 1120 to form a System in Package (SiP). For one embodiment, at least one of the processor(s) 1140 may be integrated on the same die with logic for one or more controller(s) of the system control logic 1120. For one embodiment, at least one of the processor(s) 1110 may be integrated on the same die with logic for one or more controller(s) of system control logic 1120 to form a System on Chip (SoC).

In various embodiments, the I/O devices 1160 may include user interfaces designed to enable user interaction with the system 1100, peripheral component interfaces designed to enable peripheral component interaction with the system 1100, and/or sensors designed to determine environmental conditions and/or location information related to the system 1100.

Figure 12:
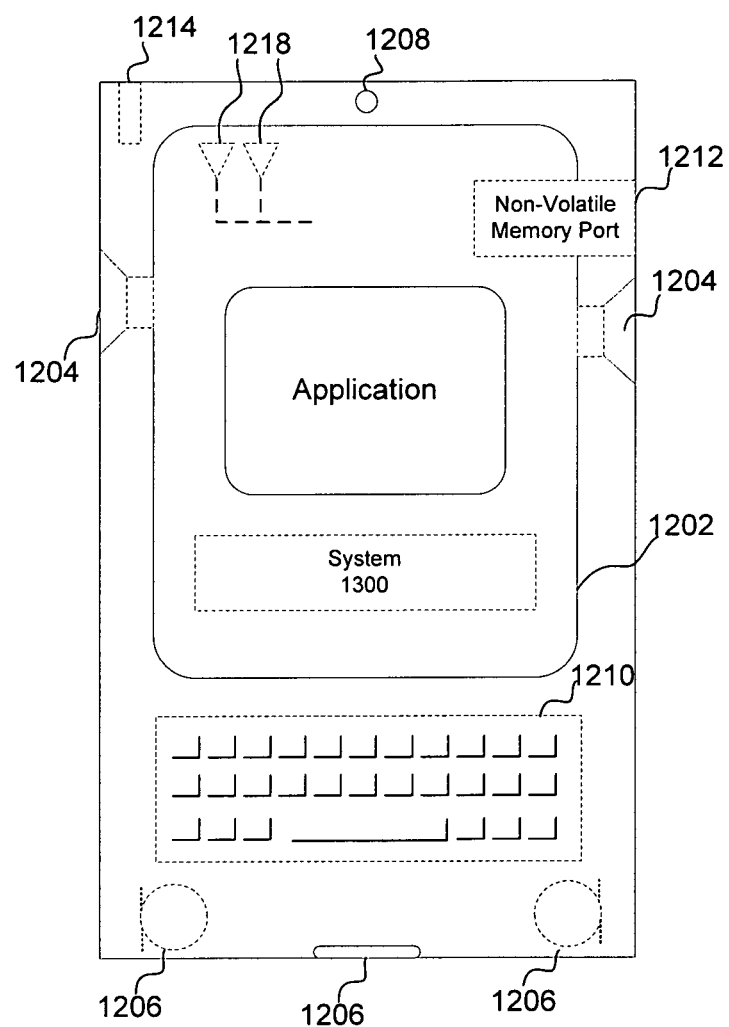
FIG. 12 depicts a user equipment according to an embodiment.

FIG. 12 shows an embodiment in which the system 1100 can be used to realize a UE such as UE 104, 202. Such a user equipment 104, 202 can be realised in form of a mobile device 1200.

In various embodiments, user interfaces of the mobile device 1200 could include, but are not limited to, a display 1202 (e.g., a liquid crystal display, a touch screen display, etc.), a speaker 1204, a microphone 1206, one or more cameras 1208 (e.g., a still camera and/or a video camera), a flashlight (e.g., a light emitting diode), and a keyboard 1210.

In various embodiments, one or more than one peripheral component interface may be provided including, but not limited to, a non-volatile memory port 1212, an audio jack 1214, and a power supply interface 1216.

In various embodiments, one or more sensors may be provided including, but not limited to, a gyro sensor, an accelerometer, a proximity sensor, an ambient light sensor, and a positioning unit. The positioning unit may also be part of, or interact with, the network interface 1150 to communicate with components of a positioning network, e.g., a global positioning system (GPS) satellite.

In various embodiments, the system 1200 may be a mobile computing device such as, but not limited to, a laptop computing device, a tablet computing device, a netbook, a mobile phone, etc. In various embodiments, the system 1200 may have more or fewer components, and/or different architectures.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 13:
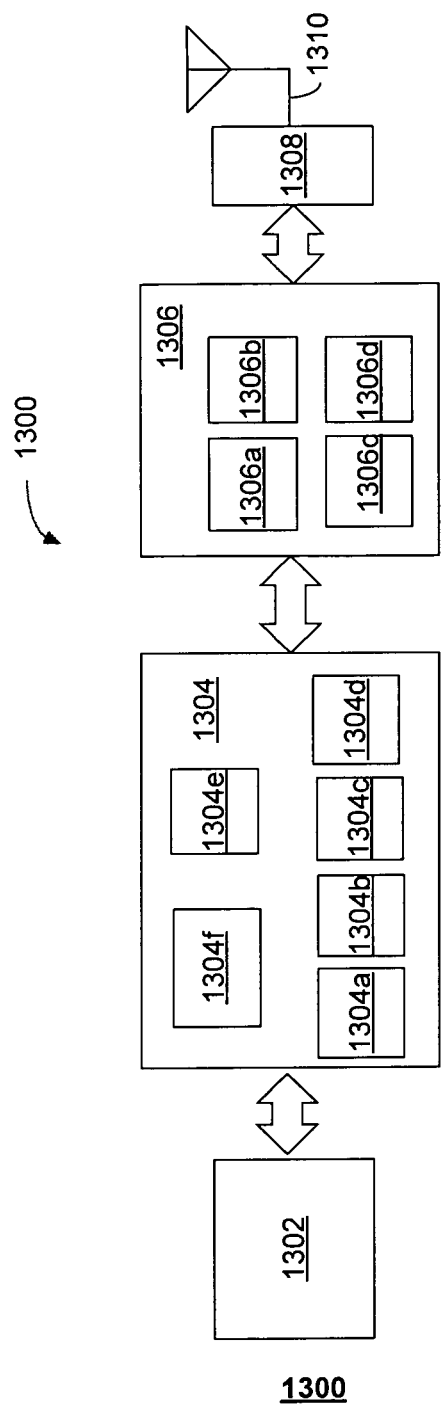
FIG. 13 depicts a user equipment according to an embodiment.

Embodiments described herein may be implemented into a system using any suitably configured hardware and/or software. FIG. 13 illustrates, for one embodiment, example components of a User Equipment (UE) device 1300. In some embodiments, the UE device 1300 may include application circuitry 1302, baseband circuitry 1304, Radio Frequency (RF) circuitry 1306, front-end module (FEM) circuitry 1308 and one or more antennas 1310, coupled together at least as shown.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304*a*, third generation (3G) baseband processor 1304*b*, fourth generation (4G) baseband processor 1304*c*, and/or other baseband processor(s) 1304*d* for other existing generations, generations in development or to be developed in the future (e.g., fifth generation (5G), 6G, etc.). The baseband circuitry 1304 (e.g., one or more of baseband processors 1304*a-d*) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304*e* of the baseband circuitry 1304 may be configured to run elements of the protocol stack for signaling of the PHY, MAC, RLC, PDCP and/or RRC layers. In some embodiments, the baseband circuitry may include one or more audio digital signal processor(s) (DSP) 1304*f*. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306a, amplifier circuitry 1306b and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the embodiments is not limited in this respect.

In some embodiments, the mixer circuitry 1306a of the receive signal path and the mixer circuitry 1306a of the transmit signal path may include two or more mixers and may be arranged for quadrature down-conversion and/or up-conversion respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct down-conversion and/or direct up-conversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310.

In some embodiments, the UE device 1300 may include additional elements such as, for example, memory/storage, display, camera, sensor, and/or input/output (I/O) interface.

In various embodiments, the UE and/or the eNB may include a plurality of antennas to implement a multiple-input-multiple-output (MIMO) transmission system, which may operate in a variety of MIMO modes, including single-user MIMO (SU-MIMO), multi-user MIMO (MU-MIMO), closed loop MIMO, open loop MIMO or variations of smart antenna processing. The UE may provide some type of channel state information (CSI) feedback to the eNB via one or more up link channels, and the eNB may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

In various embodiments, the UE may transmit CSI feedback to the eNB. The CSI feedback may include information related to channel quality index (CQI), precoding matrix indicator (PMI), and rank indication (RI). PMI may reference, or otherwise uniquely identify, a precoder within the codebook. The eNB may adjust the downlink channel based on the precoder referenced by the PMI.

The components and features of the above eNBs and UEs may be implemented using any combination of discrete circuitry, application specific integrated circuits (ASICs), logic gates and/or single chip architectures. Further, the features of UE may be implemented using microcontrollers, programmable logic arrays and/or microprocessors or any combination of the foregoing where suitably appropriate. It is noted that hardware, firmware and/or software elements may be collectively or individually referred to as "logic" or "circuit".

The various embodiments may be used in a variety of applications including transmitters and receivers of a radio system, although the embodiments are not limited in this respect. Radio systems specifically included within the scope of the present invention include, but are not limited to, network interface cards (NICs), network adaptors, fixed or mobile client devices, relays, eNodeB or transmit points, femtocells, gateways, bridges, hubs, routers, access points, or other network devices. Further, the radio systems within the scope of the embodiments may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

It will be appreciated that embodiments can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that the storage devices and storage media are embodiments of machine-readable storage, for example, non-transitory machine-readable storage, that are suitable for storing a program or programs comprising instructions that, when executed, implement embodiments described and claimed herein. Accordingly, embodiments provide machine executable code for implementing a system, apparatus, eNB, UE, device or method as described herein or as claimed herein and machine readable storage storing such a program or programs. Still further, such programs may be conveyed electronically via any medium such as a communication signal carried over a wired or wireless connection and embodiments suitably encompass the same.

In light of the above, example implementations supporting communications with multiple UEs belonging, for example, to the same cell that are, or can be, partially or completely co-scheduled on the same resources such as at least one of bandwidth and time slots. Embodiments can reduce the interferences between, or increase the, or provide, orthogonality between multiplexed DM-RS signals associated with one or more respective layers. The various DM-RS signals can be associated with respective layers. A receiver, in the UE or eNB, is aware of the various DM-RSs associated with each layer and uses the DM-RSs to produce an estimate of the associated channel, or channels, which is used by the receiver in recovering transmitted data from a stream of received data. The layers can be associated with a single UE or with multiple UEs.

In any or all of the above embodiments, it can be appreciated that a given serving cell can be configured with a predetermined number of parameter sets by higher layer signalling to support a UE decoding the PDSCH or EPDCCH in accordance with a predetermined message or information element such as at least one of a predetermined format DCI intended for the UE or a PDSCH configuration information element. The PDSCH configuration information element can specify at least one of a common PDSCH configuration or a UE-specific PDSCH configuration.

Embodiments are also provided according to the following clauses:

Clause 1. An eNodeB (eNB) for supporting user equipment (UE) specific multi-user, multiple input multiple output communication, the eNB comprising processing circuitry to: establish demodulation reference signals (DM-RS) for an antenna port mapping comprising a respective plurality of antenna ports (7,8 or 9,10); establish second demodulation reference signals (DM-RS) for a further antenna port mapping of a respective plurality of antenna ports; and selectably switch between said antenna port mapping and said further antenna port mapping according to whether or not orthogonal or non-orthogonal demodulation reference signals are selected as demodulation reference signals.

Clause 2. The eNB of clause 1, wherein the orthogonal demodulation reference signals are associated with respective orthogonal cover codes.

Clause 3. The eNB of either of clauses 1 and 2, wherein the orthogonal demodulation reference signals are associated with respective orthogonal cover codes having a minimum code length of 4.

Clause 4. The eNB of any preceding clause, in which the non-orthogonal demodulation reference signals are associated with respective scrambling identities.

Clause 5. An eNB for supporting user equipment (UE) specific multi-user, multiple input multiple output communication, the eNB comprising processing circuitry to: establish demodulation reference signals (DM-RS) for at least a predetermined pair of antenna ports (7,8 or 9,10), establish second demodulation reference signals (DM-RS) for at least a further predetermined pair of antenna ports (9,10), selectably switch between said demodulation reference signals (DM-RS) for at least a predetermined pair of antenna ports (7,8 or 9,10) and said second demodulation reference signals (DM-RS) for at least a further predetermined pair of antenna ports (9,10) according to whether or not orthogonal or non-orthogonal demodulation reference signals are selected as demodulation reference signals.

Clause 6. The eNB of clause 5, wherein the orthogonal demodulation reference signals are associated with respective orthogonal cover codes.

Clause 7. The eNB of either of clauses 5 and 6, wherein the orthogonal demodulation reference signals are associated with respective orthogonal cover codes having a minimum code length of 4.

Clause 8. The eNB of any of clauses 5 to 7, in which the non-orthogonal demodulation reference signals are associated with respective scrambling identities.

Clause 9. A method of creating a downlink control information (DCI) message for supporting UE specific signalling in multi-user multiple input multiple output (MU-MIMO) communication; the DCI message comprising data associated with a demodulation reference signal associated with at least one of one or more than one antenna port, a scrambling identity ($n_{SCID}$), or two or more transmission layers.

Clause 10. The method of clause 9, wherein the data associated with a demodulation reference signal (DM-RS) associated with at least one of one or more than one antenna port, scrambling identity and a plurality of layers comprises data associated with a set {a plurality of layers, at least a pair of antenna ports, a scrambling identity for said at least a pair of antenna ports}.

Clause 11. The method of clause 10, wherein the data associated with a {a plurality of layers, at least a pair of antenna ports, and a scrambling identity for said at least a pair of antenna ports} comprises data associated with at least one or more of {2 layers, ports 9-10, $n_{SCID}$=0}, {2 layers, ports 9-10, $n_{SCID}$=1}, {3 layers, ports 7-9, $n_{SCID}$=0}, {3 layers, ports 7-9, $n_{SCID}$=1}, {4 layers, ports 7-10, $n_{SCID}$=1}, {4 layers, ports 7-10, $n_{SCID}$=0}.

Clause 12. A method of creating a downlink control information (DCI) message for supporting UE specific communication using a respective reference signal (DM-RS) in multi-user multiple input multiple output (MU-MIMO) communication; the DCI message comprising data associated with one or more than one antenna port, a scrambling identity, a number of layers and an orthogonal cover code associated with the reference signal; the orthogonal cover code being an indication to a receiving UE regarding processing the respective reference signal Clause 13. The method of clause 12, wherein the orthogonal cover code comprises an orthogonal cover code (OCC) associated with the UE specific reference signal.

Clause 14. The method of either of clauses 12 and 13, wherein the data associated with said one or more than one antenna port, a scrambling identity, a number of layers and an orthogonal cover code associated with the reference signal comprises data associated with a parameter set of {at least one layer, at least one antenna port, at least one of a scrambling identity for said at least one antenna port and an orthogonal cover code}.

Clause 15. The method of clause 14, wherein said data associated with the parameter set of {at least one layer, at least one antenna port, and at least one of a scrambling identity for said at least one antenna port and an orthogonal cover code} comprises data associated with at least one or more of {1 layer, port 11, $n_{SCID}$=1, OCC=4}, {1 layer, port 13, $n_{SCID}$=1, OCC=4}, {2 layers, ports 11,13, $n_{SCID}$=0}, {2 layers, ports 11,13, $n_{SCID}$=1}, {2 layers, ports 7-8, $n_{SCID}$=0, OCC=4}, {2 layers, ports 7-8, $n_{SCID}$=1, OCC=4}, where OCC represents the length of a respective orthogonal code.

Clause 16. The method of any of clauses 12 to 15, wherein the orthogonal code comprises an orthogonal cover code associated with the UE specific reference signal.

Clause 17. The method of any of clauses 12 to 16, wherein said data associated with one or more than one antenna port, a scrambling identity, a number of layers and an orthogonal code associated with the reference signal comprises power control data associated with controlling power of the one or more than one antenna port.

Clause 18. The method of clause 17, wherein the power control data associated with controlling power of the one or more than one antenna port comprises data associated with power de-boosting for the one or more than one antenna port.

Clause 19. The method of clause 18, wherein the data associated with power de-boosting for the one or more than one antenna port comprises data associated with power de-boosting by a magnitude of at least −1 dB.

Clause 20. The method of any of clauses 12 to 19, wherein the data associated with the one or more than one antenna port, a scrambling identity, a number of layers and an orthogonal cover code associated with the reference signal is associated with a respective cell operable in a predetermined transmission mode.

Clause 21. The method of clause 20, where the predetermined transmission mode is transmission mode 9.

Clause 22. The method of any of clauses 12 to 19, wherein the data associated with the one or more than one antenna port, a scrambling identity, a number of layers and an orthogonal cover code associated with the reference signal is associated with a PDSCH resource element mapping and quasi co-location set for a further predetermined transmission mode.

Clause 23. The method of clause 22, wherein the further predetermined transmission mode is transmission mode 10.

Clause 24. An information element associated with configuring a Physical Downlink Shared Channel, the information element comprising data associated with UE specific reference signal antenna ports or resource element mappings to be used by a plurality of user equipments in a multi-user multiple input multiple output (MU-MIMO) wireless communication, the information element comprising an indication associated with a prescribed layer for configuring the user equipments for higher order MU-MIMO.

Clause 25. The information element of clause 24, in which the prescribed layer is a Radio Resource Control (RRC) layer.

Clause 26. The information element of clause 24, wherein said data is:

```
-- ASN1START
PDSCH-RE-MappingQCL-Config-r11 ::=      SEQUENCE {
    pdsch-RE-MappingQCL-ConfigId-r11        PDSCH-RE-MappingQCL-ConfigId-r11,
    optionalSetOfFields-r11                 SEQUENCE {
```

-continued

```
crs-PortsCount-r11                    ENUMERATED {n1, n2, n4, spare1},
crs-FreqShift-r11                     INTEGER (0..5),
mbsfn-SubframeConfigList-r11          CHOICE {
  release                               NULL,
  setup                                 SEQUENCE {
    subframeConfigList                    MBSFN-
SubframeConfigList
  }
}                                     OPTIONAL,
pdsch-Start-r11                       ENUMERATED {reserved, n1, n2, n3, n4,
assigned}
}                                     OPTIONAL,
csi-RS-ConfigZPId-r11                 CSI-RS-ConfigZPId-r11,
qcl-CSI-RS-ConfigNZPId-r11            CSI-RS-ConfigNZPId-r11
alternativeUeRsAntPortMapping-r13     BOOLEAN
-- ASN1STOP
``` where the field or parameter alternativeUeRsAntPortMapping-r13 is associated with a DM-RS mapping selected for use in MU-MIMO.

Clause 27. A method of configuring a user equipment (UE); the UE being switchable between a plurality of configuration states associated with one or more transmissions; the configuration states being associated with respective configuration data comprising at least one of first configuration data associated with an initial set of configurations of at least one of antenna ports, UE reference signals and respective codes, or second configuration data associated with a further set of configurations of at least one of antennas ports, UE reference signals or respective codes; the method comprising processing data associated with switching from the first configuration state to the second configuration state; initiating switching from the first configuration state to the second configuration state; processing received signals, pending switching to the second configuration state, using a common configuration state comprising common configuration data associated with both the first and second configuration data; and completing said switching from the first configuration state to the second configuration state and using the second configuration data.

Clause 28. The method of clause 27, comprising at least one of replacing the first configuration data with the second configuration data, updating the first configuration data with the second configuration data, or changing selectable sets of configurations of the first configuration data with sets of configurations of the second configuration data.

Clause 29. The method of any of clauses 27 to 28, wherein said completing comprises outputting a message to a Radio Resource Control layer (RRC) comprising data associated with indicating that configuration using the second configuration data has been completed.

Clause 30. The method of any of clauses 27 to 29, wherein the first configuration data comprises a set of configurations associated with one or more than one of antenna port or antenna ports, scrambling code, orthogonal code and one or more than one layer, one or more than one UE-specific reference sequence.

Clause 31. The method of clause 30, wherein the one or more than one UE-specific reference sequence is a demodulation reference sequence, demodulation reference signal (DM-RS).

Clause 32. The method of any of clauses 27 to 31, wherein the first configuration data comprises legacy configuration data and the second configuration data comprises at least one of

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ | or

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10, |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4 |

Clause 33. The method of any of clauses 27 to 31, wherein at least one of the first configuration data and the second configuration data comprises

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ |

-continued

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10, |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4 |

Clause 34. A user equipment (UE) for wireless communication; the UE being switchable between a plurality of configuration states associated with one or more transmissions; the configuration states being associated with respective configuration data comprising at least one of first configuration data associated with an initial set of configurations of at least one of antenna ports, UE reference signals or respective codes, and second configuration data associated with a further set of configurations of at least one of antennas ports, UE reference signals or respective codes; the UE comprising logic or processing circuitry to process data associated with switching from the first configuration state to the second configuration state; initiate switching from the first configuration state to the second configuration state; process received signals, pending switching to the second configuration state, using a common configuration state comprising common configuration data associated with both the first and second configuration data; and complete said switching from the first configuration state to the second configuration state and using the second configuration data.

Clause 35. The UE of clause 34, comprising processing circuitry to at least one of replace the first configuration data with the second configuration data, update the first configuration data with the second configuration data, or change selectable sets of configurations of the first configuration data with sets of configurations of the second configuration data.

Clause 36. The UE of clause any of clauses 34 to 35, wherein the processing circuitry to complete comprises processing circuitry to output a message to a Radio Resource Control layer (RRC) comprising data associated with indicating that configuration using the second configuration data has been completed.

Clause 37. The UE of any clauses 34 to 36, wherein the first configuration data comprises a set of configurations associated with one or more than one of an antenna port or antenna ports, scrambling code, orthogonal cover code and one or more than one layer, or one or more than one UE-specific reference sequence.

Clause 38. The UE of clause 37, wherein the one or more than one UE-specific reference sequence is a demodulation reference sequence.

Clause 39. The UE of any of clauses 34 to 38, wherein the first configuration data comprises legacy configuration data and the second configuration data comprises at least one of

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ | or

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10, |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4 |

Clause 40. The UE of any of clauses 34 to 37, wherein at least one of the first configuration data and the second configuration data comprises

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ | or

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10, |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4 |

Clause 41. A method of distributing Demodulation Reference (DM-RS) signals for supporting Multi-User Multiple Input Multiple Output (MU-MIMO) communications; the method comprising: transmitting or receiving demodulation reference signals according to a first parameter set comprising one or more than one prescribed antenna port, one or more than one layer, one or more than one scrambling identifier, and an orthogonal cover code (OCC) having a predetermined length, and switching to transmitting or receiving demodulation reference signals according to a second parameter set comprising one or more than one prescribed antenna port, one or more than one layer, one or more than one scrambling identifier, and an orthogonal cover code having a predetermined length, the first and second parameter sets having one or more than one common entry.

Clause 42. The method of clause 41, in which the first parameter set and the second parameter set are selected according to a number of codewords to be used in transmissions.

Clause 43. The method of either of clauses 41 and 42, in which the first parameter set and second parameter set comprise one or more than one of the following parameter sets {1 layer, port 7, nSCID=0}, {1 layer, port 7, nSCID=1}, {1 layer, port 8, nSCID=0}, {1 layer, port 8, nSCID=1}, {2 layers, ports 7-8 or 9-10}, {3 layers, ports 7-9}, {4 layers, ports 7-10}.

Clause 44. The method of either of clauses 41 and 42, in which the first parameter set and second parameter set comprise one or more than one of the following parameter sets{2 layers, ports 7-8, nSCID=0}, {2 layers, ports 7-8, nSCID=1}, {2 layers, ports 9-10, nSCID=0}, {2 layers, ports 9-10, nSCID=1}, {3 layers, ports 7-9, nSCID=0}, {4 layers, ports 7-10, nSCID=0}, {3 layers, ports 7-9, nSCID=1}, {4 layers, ports 7-10, nSCID=1}.

Clause 45. An eNB for creating a Downlink Control Message (DCI) message for supporting user equipment (UE) specific signalling in Multi-User Multiple Input Multiple Output (MU-MIMO) communication; the eNB comprising circuitry for: creating and outputting the DCI message comprising data associated with a demodulation reference signal; the demodulation reference signal being associated with at least one of one or more than one antenna port, one or more than one scrambling identity, or a plurality of transmission layers.

Clause 46. The eNB of clause 45, wherein the data associated with a demodulation reference signal associated with at least one of one or more than one antenna port, one or more than one scrambling identity or a plurality of layers comprises data associated with a set of {a plurality of layers, at least a pair of antenna ports, and a scrambling identity for said at least a pair of antenna ports}.

Clause 47. The method of clause 46, wherein the data associated with a set of {a plurality of layers, at least a pair of antenna ports, and a scrambling identity for said at least a pair of antenna ports} comprises data associated with at least one or more of {2 layers, ports 9-10, nSCID=0}, {2 layers, ports 9-10, nSCID=1}, {3 layers, ports 7-9, nSCID=0}, {3 layers, ports 7-9, nSCID=1}, {4 layers, ports 7-10, nSCID=1}, {4 layers, ports 7-10, nSCID=0}.

Clause 48. A system for creating a Downlink Control Information (DCI) message for supporting user equipment (UE) specific communication using a respective reference signal (DM-RS) in Multi-User Multiple Input Multiple Output (MU-MIMO) communication; the system comprising logic for creating the DCI message comprising data associated with one or more than one antenna port, a scrambling identity, a number of layers and an orthogonal cover code (OCC) associated with the reference signal; the orthogonal cover code being an indication to a receiving UE regarding processing the respective reference signal Clause 49. The system of clause 48, wherein the orthogonal cover code comprises an orthogonal cover code associated with the UE specific reference signal.

Clause 50. The method of either of clauses 48 and 49, wherein the data associated with said one or more than one antenna port, a scrambling identity, a number of layers and an orthogonal cover code associated with the reference signal comprises data associated with a parameter set of {at least one layer, at least one antenna port, and at least one of a scrambling identity for said at least one antenna port and an orthogonal cover code}.

Clause 51. The system of clause 50, wherein data associated with the parameter set of {at least one layer, at least one antenna port, and at least one of a scrambling identity for said at least one antenna port and an orthogonal code} comprises data associated with at least one or more of {1 layer, port 11, nSCID=1, OCC=4}, {1 layer, port 13, $n_{SCID}$=1, OCC=4}, {2 layers, ports 11,13, $n_{SCID}$=0}, {2 layers, ports 11,13, $n_{SCID}$=1}, {2 layers, ports 7-8, $n_{SCID}$=0, OCC=4}, {2 layers, ports 7-8, $n_{SCID}$=1, OCC=4}, where OCC represents the length of a respective orthogonal cover code.

Clause 52. The system of any of clauses 48 to 51, wherein the orthogonal cover code comprises an orthogonal cover code associated with the UE specific reference signal.

Clause 53. The system of any of clauses 48 to 52, wherein said data associated with one or more than one antenna port, a scrambling identity, a number of layers and an orthogonal cover code associated with the reference signal comprises power control data associated with controlling power of the one or more than one antenna port.

Clause 54. The system of clause 53, wherein the power control data associated with controlling power of the one or more than one antenna port comprises data associated with power de-boosting for the one or more than one antenna port.

Clause 55. The system of clause 54, wherein the data associated with power de-boosting for the one or more than one antenna port comprises data associated with power de-boosting by a magnitude of at least −1 dB.

Clause 56. The system of any of clauses 48 to 55, wherein the data associated with one or more than one antenna port, a scrambling identity, a number of layers and an orthogonal cover code associated with the reference signal is associated with a respective cell in a predetermined transmission mode.

Clause 57. The system of clause 56, where the predetermined transmission mode is transmission mode 9.

Clause 58. The system of any of clauses 48 to 57, wherein the data associated with one or more than one antenna port, a scrambling identity, a number of layers and an orthogonal code associated with the reference signal is associated with a PDSCH resource element mapping and quasi co-location set for a further predetermined transmission mode.

Clause 59. The system of clause 58, wherein the further predetermined transmission mode is transmission mode 10.

Clause 60. A device for configuring a user equipment (UE); the UE being switchable between a plurality of configuration states associated with one or more transmissions; the configuration states being associated with respective configuration data comprising at least one of first configuration data associated with an initial set of configurations of at least one of antenna ports, UE reference signals or respective codes, and second configuration data associated with a further set of configurations of at least one of antennas ports, UE reference signals or respective codes; the device comprising logic to: process data associated with switching from the first configuration state to the second configuration state; initiate switching from the first configuration state to the second configuration state; process received signals, pending switching to the second configuration state, using a common configuration state comprising common configuration data associated with both the first and second configuration data; and complete said switching from the first configuration state to the second configuration state and using the second configuration data.

Clause 61. The device of clause 60, comprising logic to at least one of replace the first configuration data with the second configuration data, update the first configuration data with the second configuration data, or change selectable sets of configurations of the first configuration data with sets of configurations of the second configuration data.

Clause 62. The device of any of clauses 60 to 61, wherein said logic to complete comprises logic to output a message to an RRC comprising data associated with indicating that configuration using the second configuration data has been completed.

Clause 63. The device of any of clauses 27 to 29, wherein the first configuration data comprises a set of configurations associated with one or more than one of antenna port or antenna ports, scrambling code, orthogonal cover code and one or more than one layer, one or more than one UE-specific reference sequence.

Clause 64. The device of clause 63, wherein the one or more than one UE-specific reference sequence is a demodulation reference sequence.

Clause 65. The device of any of clauses 60 to 64, wherein the first configuration data comprises legacy configuration data and the second configuration data comprises at least one of

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ | or

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10, |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4 |

Clause 66. The device of any of clauses 60 to 64, wherein at least one of the first configuration data and the second configuration data comprises

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ | or

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = $ , OCC = 4 | 3 | 4 layers, ports 7-10, |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4 |

Clause 67. An eNB for distributing Demodulation Reference Signal (DM-RS) signals for supporting Multi-User Multiple Input Multiple Output (MU-MIMO) communications; the eNB comprising logic to: transmit or receive demodulation reference signals according to a first parameter set comprising one or more than one prescribed antenna port, one or more than one layer, one or more than one scrambling define $n_{SCID}$ identifier, and an orthogonal cover code (OCC) having a predetermined length, and to switch to transmitting or receiving demodulation reference signals according to a second parameter set comprising one or more than one prescribed antenna port, one or more than one number of layers, one or more than one scrambling code identifier, and an orthogonal cover code having a predetermined length, the first and second parameter sets having one or more than one common entry.

Clause 68. The eNB of clause 67, in which the first parameter set and second parameter set are selected according to a number of codewords to be used in transmissions.

Clause 69. The eNB of either of clauses 67 and 68, in which the first parameter set and second parameter set comprise one or more than one of the following parameter sets of {1 layer, port 7, nSCID=0}, {1 layer, port 7, nSCID=1}, {1 layer, port 8, nSCID=0}, {1 layer, port 8, nSCID=1}, {2 layers, ports 7-8 or 9-10}, {3 layers, ports 7-9}, {4 layers, ports 7-10}.

Clause 70. The eNB of either of clauses 67 and 68, in which the first parameter set and second parameter set comprise one or more than one of the following parameter sets of {2 layers, ports 7-8, nSCID=0}, {2 layers, ports 7-8, nSCID=1}, {2 layers, ports 9-10, nSCID=0}, {2 layers, ports 9-10, nSCID=1}, {3 layers, ports 7-9, nSCID=0}, {4 layers, ports 7-10, nSCID=0}, {3 layers, ports 7-9, nSCID=1}, {4 layers, ports 7-10, nSCID=1}.

Clause 71. A method, user equipment, eNB, apparatus or system substantially as described herein with reference to and/or as illustrated in one or more of the accompanying drawings taken jointly and severally in any and all permutations.

Clause 72. A UE, eNB, system, device or apparatus comprising means for implementing a method of any of clauses 9 to 22, 27 to 33, 41 to 45.

Clause 73. Machine executable instructions arranged, when executed by one or more than one processor, implement a method of any of clauses 9 to 22, 27 to 33, 41 to 45.

Clause 74. Machine readable storage storing machine executable instructions of clause 73.

Clause 75. An apparatus for an eNodeB (eNB) for creating a Downlink Control Information (DCI) message for supporting user equipment (UE) specific signalling in Multi-User Multiple Input Multiple Output (MU-MIMO) communication; apparatus comprising circuitry for: creating and outputting the DCI message comprising data associated with a demodulation reference signal; the demodulation reference signal being associated with at least one of one or more than an antenna port, a scrambling identity (nSCID) or two or more transmission layers.

Clause 76. The apparatus of clause 75, wherein the data associated with a demodulation reference signal comprises data associated with a set of {a plurality of layers, at least a pair of antenna ports, and a scrambling identity for said at least a pair of antenna ports}.

Clause 77. The apparatus of either of clauses 75 and 76, wherein the data associated with the set of {a plurality of layers, at least a pair of antenna ports, and a scrambling identity for said at least a pair of antenna ports} comprises data associated with at least one or more of {2 layers, ports 9-10, nSCID=0}, {2 layers, ports 9-10, nSCID=1}, {3 layers, ports 7-9, nSCID=0}, {3 layers, ports 7-9, nSCID=1}, {4 layers, ports 7-10, nSCID=1}, or {4 layers, ports 7-10, nSCID=0}.

Example 159

An eNB, UE, device, apparatus or system as described or claimed herein, and/or as expressed in any and all examples, further comprising at least one of:

a display, such as, for example, a touch sensitive display, an input device, such as, for example, one or more than one of a button, a key pad, an audio input, a video input, and/or an output device such as, for example, an audio output, a video output, a haptic device taken jointly and severally in any and all permutations.

As used in this specification, the formulation "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order.

It will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

The invention claimed is:

1. A user equipment (UE) for wireless communication; the UE being switchable between a plurality of configuration states associated with one or more transmissions; the configuration states being associated with respective configuration data comprising at least one of first configuration data associated with an initial set of configurations of at least one of antenna ports, UE reference signals or respective codes, and second configuration data associated with a further set of configurations of at least one of antennas ports, UE reference signals or respective codes; the UE comprising logic to:

process data associated with a switch from a first configuration state to a second configuration state;

initiate a switch from the first configuration state to the second configuration state;

process received signals, pending a switch to the second configuration state, using a common configuration state comprising common configuration data associated with both the first and second configuration data; and complete said switch from the first configuration state to the second configuration state and using the second configuration data.

2. The UE of claim 1, comprising logic to at least one of replace the first configuration data with the second configuration data, update the first configuration data with the second configuration data or change selectable sets of configurations of the first configuration data with sets of configurations of the second configuration data.

3. The UE of claim 1, wherein the logic to complete said switch comprises logic to output a message to a Radio Resource Control layer (RRC) comprising data associated with indicating that configuration using the second configuration data has been completed.

4. The UE of claim 1, wherein the first configuration data comprises a set of configurations associated with one or more than one of an antenna port or antenna ports, scrambling identity ($n_{SCID}$), orthogonal cover code (OCC) and one or more than one layer or one or more than one UE-specific reference sequence.

5. The UE of claim 4, wherein the one or more than one UE-specific reference sequence is a demodulation reference sequence (DM-RS).

6. The UE of claim 1, wherein $n_{SCID}$ is associated with a scrambling identity and wherein the first configuration data comprises legacy configuration data and the second configuration data comprises at least one of

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |

-continued

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ | or

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10 |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4. |

7. The UE of claim 1, wherein $n_{SCID}$ is associated with a scrambling identity and wherein at least one of the first configuration data or the second configuration data comprises

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ | or

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10 |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4. |

8. A system for creating a Downlink Control Information (DCI) message for supporting user equipment (UE) specific communication using a respective reference signal (DM-RS) in Multi-User Multiple Input Multiple Output (MU-MIMO) communication; the system comprising logic to: create the DCI message comprising data associated with one or more than one antenna port, a scrambling identity ($n_{SCID}$), a number of layers or an orthogonal cover code associated with the reference signal; the orthogonal cover code being an indication to a receiving UE regarding processing the respective reference signal, and logic to: output the DCI message for conveying to a UE associated with the UE specific communication, wherein the data associated with said one or more than one antenna port, a scrambling identity, a number of layers or an orthogonal cover code associated with the reference signal comprises data associated with a parameter set of {at least one layer, at least one antenna port, at least one of a scrambling identity for said at least one antenna port or an orthogonal cover code}, the parameter set to include:

{1 layer, port 11, $n_{SCID}=1$, OCC=4};
{1 layer, port 13, $n_{SCID}=1$, OCC=4};
{2 layers, ports 11,13, $n_{SCID}=0$};
{2 layers, ports 11,13, $n_{SCID}=1$};
{2 layers, ports 7-8, $n_{SCID}=0$, OCC=4}; or
{2 layers, ports 7-8, $n_{SCID}=1$, OCC=4}, where OCC represents the length of a respective orthogonal cover code.

9. The system of claim 8, wherein the orthogonal cover code comprises an orthogonal cover code associated with the UE specific reference signal.

10. One or more non-transitory, computer-readable media having instructions that, when executed by one or more processors, causes a user equipment (UE) to:

process data associated with a switch of the UE from a first configuration state associated with first configuration data to a second configuration state associated with second configuration data, the first and second configuration data associated with respective sets of configurations that include antenna ports, UE reference signals, or codes;

initiate a switch from the first configuration state to the second configuration state;

process received signals, pending a switch to the second configuration state, using a common configuration state that includes common configuration data associated with both the first and second configuration data; and complete said switch from the first configuration state to the second configuration state and using the second configuration data.

11. The one or more non-transitory, computer-readable media of claim 10, wherein the instructions, when executed, further cause the UE to replace the first configuration data with the second configuration data, update the first configuration data with the second configuration data, or change selectable sets of configurations of the first configuration data with sets of configurations of the second configuration data.

12. The one or more non-transitory, computer-readable media of claim 10, wherein the instructions, when executed, further cause the UE to output a message to a Radio Resource Control layer (RRC) comprising data associated with an indication that configuration using the second configuration data has been completed.

13. The one or more non-transitory, computer-readable media of claim 10, wherein the first configuration data comprises a set of configurations associated with an antenna port, scrambling identity ($n_{SCID}$), orthogonal cover code (OCC), one or more layers, or a demodulation reference sequence (DM-RS).

14. The one or more non-transitory, computer-readable media of claim 10, wherein $n_{SCID}$ is associated with a scrambling identity and wherein the first configuration data comprises legacy configuration data and the second configuration data comprises at least one of

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ | or

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10 |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4 |

15. The one or more non-transitory, computer-readable media of claim 10, wherein $n_{SCID}$ is associated with a scrambling identity and wherein at least one of the first configuration data or the second configuration data comprises

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 2 layers, ports 7-8 or 9-10 | 4 | 3 layers, ports 7-9, $n_{SCID} = 0$ |
| 5 | 3 layers, ports 7-9 | 5 | 4 layers, ports 7-10, $n_{SCID} = 0$ |
| 6 | 4 layers, ports 7-10 | 6 | 3 layers, ports 7-9, $n_{SCID} = 1$ |
| 7 | Reserved | 7 | 4 layers, ports 7-10, $n_{SCID} = 1$ | or

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$, OCC = 4 | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$, OCC = 4 | 3 | 4 layers, ports 7-10 |
| 4 | 2 layers, ports 7-8 | 4 | 2 layers, ports 11, 13, $n_{SCID} = 0$ |
| 5 | 1 layer, port 11, $n_{SCID} = 1$ | 5 | 2 layers, ports 11, 13, $n_{SCID} = 1$ |
| 6 | 1 layer, port 13, $n_{SCID} = 1$ | 6 | 2 layers, ports 7-8, $n_{SCID} = 0$, OCC = 4 |
| 7 | Reserved | 7 | 2 layers, ports 7-8, $n_{SCID} = 1$, OCC = 4 |

* * * * *